United States Patent
Ko et al.

(10) Patent No.: US 11,538,063 B2
(45) Date of Patent: Dec. 27, 2022

(54) ONLINE FRAUD PREVENTION AND DETECTION BASED ON DISTRIBUTED SYSTEM

(71) Applicant: Samsung Electronics Co., Ltd., Suwon-si (KR)

(72) Inventors: Kwangwon Ko, Suwon-si (KR); Baekjun Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/265,376

(22) PCT Filed: Aug. 23, 2019

(86) PCT No.: PCT/KR2019/010794
§ 371 (c)(1),
(2) Date: Feb. 2, 2021

(87) PCT Pub. No.: WO2020/055002
PCT Pub. Date: Mar. 19, 2020

(65) Prior Publication Data
US 2021/0295380 A1    Sep. 23, 2021

(30) Foreign Application Priority Data
Sep. 12, 2018    (KR) .................. 10-2018-0108862

(51) Int. Cl.
*G06Q 30/02* (2012.01)
*G06N 20/00* (2019.01)
*G06N 5/04* (2006.01)

(52) U.S. Cl.
CPC .......... *G06Q 30/0248* (2013.01); *G06N 5/04* (2013.01); *G06N 20/00* (2019.01); *G06Q 30/0277* (2013.01)

(58) Field of Classification Search
None
See application file for complete search history.

(56) References Cited

U.S. PATENT DOCUMENTS 4,880,964 A    11/1989    Donahue
5,335,278 A    8/1994    Matchett et al.
(Continued)

FOREIGN PATENT DOCUMENTS

EP    0 957 644 A1    11/1991
EP    0 653 868 A2    5/1995
(Continued)

OTHER PUBLICATIONS

US 9,648,516 B2, 05/2017, Grootwassink et al. (withdrawn)
(Continued)

*Primary Examiner* — David J Stoltenberg
(74) *Attorney, Agent, or Firm* — Jefferson IP Law, LLP

(57) ABSTRACT

Disclosed are an electronic device and a method for controlling same. A method for controlling an electronic device according to the present disclosure comprises: a step of obtaining a program which shares data about an advertisement with another electronic device so as to verify the shared data; a step of, when an event for the advertisement occurs, generating first data including information about the event for the advertisement; a step of transmitting the generated first data to the other electronic device; a step of receiving second data including information about an event from the advertisement generated from the other electronic device; and a step of verifying the second data using the program.

7 Claims, 9 Drawing Sheets

(56) References Cited

U.S. PATENT DOCUMENTS

| | | |
|---|---|---|
| 5,420,908 A | 5/1995 | Hodges et al. |
| 5,420,910 A | 5/1995 | Rudokas et al. |
| 5,495,521 A | 2/1996 | Rangachar |
| 5,541,977 A | 7/1996 | Hodges et al. |
| 5,708,716 A | 1/1998 | Tisdale et al. |
| 5,719,918 A | 2/1998 | Serbetciouglu et al. |
| 5,734,977 A | 3/1998 | Sanmugam |
| 5,748,742 A | 5/1998 | Tisdale et al. |
| 5,754,952 A | 5/1998 | Hodges et al. |
| 5,901,351 A | 5/1999 | Willey |
| 5,907,803 A | 5/1999 | Nguyen |
| 5,953,652 A | 9/1999 | Amin et al. |
| 5,966,650 A | 10/1999 | Hobson et al. |
| 5,978,669 A | 11/1999 | Sanmugam |
| 6,023,619 A | 2/2000 | Kaminsky |
| 6,035,039 A | 3/2000 | Tisdale et al. |
| 6,112,084 A | 8/2000 | Sicher et al. |
| 6,128,503 A | 10/2000 | Granberg et al. |
| 6,181,925 B1 | 1/2001 | Kaminsky et al. |
| 6,223,290 B1 | 4/2001 | Larsen et al. |
| 6,266,525 B1 | 7/2001 | Peterson |
| 6,295,446 B1 | 9/2001 | Rocha |
| 6,324,286 B1 | 11/2001 | Lai et al. |
| 6,370,373 B1 | 4/2002 | Gerth et al. |
| 6,449,479 B1 | 9/2002 | Sanchez |
| 6,505,773 B1 | 1/2003 | Palmer et al. |
| 6,539,082 B1 | 3/2003 | Lowe et al. |
| 6,847,393 B2 | 1/2005 | Ashe et al. |
| 6,847,953 B2 | 1/2005 | Kuo |
| 6,901,406 B2 | 5/2005 | Nabe et al. |
| 6,938,039 B1 | 8/2005 | Bober et al. |
| 7,006,993 B1 | 2/2006 | Cheong et al. |
| 7,020,622 B1 | 3/2006 | Messer |
| 7,043,471 B2 | 5/2006 | Cheung et al. |
| 7,076,479 B1 | 7/2006 | Cheung et al. |
| 7,083,084 B2 | 8/2006 | Graves et al. |
| 7,089,592 B2 | 8/2006 | Adjaoute |
| 7,136,841 B2 | 11/2006 | Cook |
| 7,155,417 B1 | 12/2006 | Sagar et al. |
| 7,165,051 B2 | 1/2007 | Ronning et al. |
| 7,170,407 B2 | 1/2007 | Wagner |
| 7,190,772 B2 | 3/2007 | Moisey et al. |
| 7,231,657 B2 | 6/2007 | Honarvar et al. |
| 7,237,717 B1 | 7/2007 | Rao et al. |
| 7,512,221 B2 | 3/2009 | Toms |
| 7,539,480 B2 | 5/2009 | Fieldhouse et al. |
| 7,596,530 B1 | 9/2009 | Glasberg |
| 7,610,040 B2 | 10/2009 | Cantini et al. |
| 7,610,216 B1 | 10/2009 | May et al. |
| 7,617,974 B2 | 11/2009 | Vandyck et al. |
| 7,634,424 B2 | 12/2009 | Steinman et al. |
| 7,650,300 B2 | 1/2010 | Darvish et al. |
| 7,656,885 B2 | 2/2010 | Tam et al. |
| 7,657,626 B1 | 2/2010 | Zwicky |
| 7,689,503 B2 | 3/2010 | Halper et al. |
| 7,690,035 B2 | 3/2010 | Sasage et al. |
| 7,693,806 B2 | 4/2010 | Yih et al. |
| 7,702,540 B1 | 4/2010 | Woolston |
| 7,729,948 B1 | 6/2010 | Gailloux et al. |
| 7,742,763 B2 | 6/2010 | Jiang |
| 7,840,578 B2 | 11/2010 | Ha et al. |
| 7,870,608 B2 | 1/2011 | Shraim et al. |
| 7,881,972 B2 | 2/2011 | Ronning et al. |
| 7,937,321 B2 | 5/2011 | Hoefelmeyer |
| 7,953,667 B1 | 5/2011 | Zuili |
| 7,961,622 B2 | 6/2011 | Russell et al. |
| 7,961,857 B2 | 6/2011 | Zoldi et al. |
| 7,962,851 B2 | 6/2011 | McAfee et al. |
| 7,971,059 B2 | 6/2011 | Calman et al. |
| 7,991,388 B1 | 8/2011 | Becker et al. |
| 7,992,777 B1 | 8/2011 | Block et al. |
| RE42,760 E | 9/2011 | Kuo |
| 8,019,320 B2 | 9/2011 | Sun et al. |
| 8,036,960 B2 | 10/2011 | Dean et al. |
| 8,045,956 B2 | 10/2011 | Sun et al. |
| 8,055,548 B2 | 11/2011 | Staib et al. |
| 8,078,509 B2 | 12/2011 | Ye et al. |
| 8,081,817 B2 | 12/2011 | Tedesco et al. |
| 8,082,173 B2 | 12/2011 | Kost et al. |
| 8,108,916 B2 | 1/2012 | Fink et al. |
| 8,109,444 B2 | 2/2012 | Jain |
| 8,131,575 B2 | 3/2012 | Messer |
| 8,135,615 B2 | 3/2012 | Bradley et al. |
| 8,145,561 B1 | 3/2012 | Zhu |
| 8,150,968 B2 | 4/2012 | Barber |
| 8,151,327 B2 | 4/2012 | Eisen |
| 8,165,563 B2 | 4/2012 | Doherty |
| 8,175,965 B2 | 5/2012 | Moore et al. |
| 8,181,246 B2 | 5/2012 | Shulman et al. |
| 8,186,578 B1 | 5/2012 | Block et al. |
| 8,204,826 B2 | 6/2012 | Banaugh et al. |
| 8,229,767 B2 | 7/2012 | Birchall |
| 8,238,905 B2 | 8/2012 | Jiang |
| 8,244,216 B1 | 8/2012 | Becker et al. |
| 8,255,247 B2 | 8/2012 | Messer |
| 8,271,396 B2 | 9/2012 | Ronning et al. |
| 8,275,353 B2 | 9/2012 | Sun et al. |
| 8,280,373 B2 | 10/2012 | Huggett et al. |
| 8,321,269 B2 | 11/2012 | Linden et al. |
| 8,359,006 B1 | 1/2013 | Zang et al. |
| 8,365,988 B1 | 2/2013 | Medina, III et al. |
| 8,386,386 B1 | 2/2013 | Zhu |
| 8,392,210 B2 | 3/2013 | Beraja et al. |
| 8,392,211 B2 | 3/2013 | Beraja et al. |
| 8,392,212 B2 | 3/2013 | Beraja et al. |
| 8,392,213 B2 | 3/2013 | Beraja et al. |
| 8,396,810 B1 | 3/2013 | Cook |
| 8,401,904 B1 | 3/2013 | Simakov et al. |
| 8,401,993 B2 | 3/2013 | Kumar et al. |
| 8,412,639 B2 | 4/2013 | Chau et al. |
| 8,459,546 B1 | 6/2013 | Block et al. |
| 8,463,237 B1 | 6/2013 | Zang et al. |
| 8,463,644 B2 | 6/2013 | Steinman et al. |
| 8,463,646 B2 | 6/2013 | Bowles et al. |
| 8,494,142 B2 | 7/2013 | Lingafelt et al. |
| 8,528,814 B2 | 9/2013 | Wolfe |
| 8,534,546 B2 | 9/2013 | McKelvey |
| 8,537,990 B2 | 9/2013 | Rudman |
| 8,539,070 B2 | 9/2013 | Barber |
| 8,548,828 B1 | 10/2013 | Longmire |
| 8,550,903 B2 | 10/2013 | Lyons et al. |
| 8,555,384 B1 | 10/2013 | Hanson et al. |
| 8,559,607 B2 | 10/2013 | Zoldi et al. |
| 8,559,926 B1 | 10/2013 | Zang et al. |
| 8,583,454 B2 | 11/2013 | Beraja et al. |
| 8,583,498 B2 | 11/2013 | Fried et al. |
| 8,606,712 B2 | 12/2013 | Choudhuri et al. |
| 8,612,543 B2 | 12/2013 | Shuster |
| 8,615,217 B2 | 12/2013 | Ravishankar et al. |
| 8,620,774 B1 | 12/2013 | Li et al. |
| 8,626,592 B2 | 1/2014 | Simakov et al. |
| 8,635,683 B2 | 1/2014 | Lingafelt et al. |
| 8,655,314 B1 | 2/2014 | Zang et al. |
| 8,824,648 B2 | 2/2014 | Zoldi et al. |
| 8,666,373 B2 | 3/2014 | Dessouky et al. |
| 8,676,616 B2 | 3/2014 | Messer |
| 8,676,637 B2 | 3/2014 | Aaron et al. |
| 8,695,097 B1 | 4/2014 | Mathes et al. |
| 8,701,991 B2 | 4/2014 | Wolfe |
| 8,719,088 B2 | 5/2014 | O'Sullivan et al. |
| 8,719,396 B2 | 5/2014 | Brindley et al. |
| 8,739,278 B2 | 5/2014 | Varghese |
| 8,751,264 B2 | 6/2014 | Beraja et al. |
| 8,751,300 B2 | 6/2014 | O'Sullivan et al. |
| 8,768,840 B2 | 7/2014 | Bozeman |
| 8,771,063 B1 | 7/2014 | Boyle |
| 8,774,372 B2 | 7/2014 | Metz et al. |
| 8,799,069 B2 | 8/2014 | Gupta et al. |
| 8,799,458 B2 | 8/2014 | Barber |
| 8,812,361 B2 | 8/2014 | Petronelli et al. |
| 8,826,393 B2 | 9/2014 | Eisen |
| 8,826,400 B2 | 9/2014 | Amaya Calvo et al. |
| 8,826,422 B2 | 9/2014 | Russell |
| 8,831,677 B2 | 9/2014 | Villa-Real |

(56) References Cited

U.S. PATENT DOCUMENTS

| | | |
|---|---|---|
| 8,833,648 B1 | 9/2014 | Medina, III et al. |
| 8,868,728 B2 | 10/2014 | Margolies et al. |
| 8,869,269 B1 | 10/2014 | Ramzan et al. |
| 8,873,813 B2 | 10/2014 | Tadayon et al. |
| 8,885,894 B2 | 11/2014 | Rowen et al. |
| 8,898,088 B2 | 11/2014 | Springer et al. |
| 8,924,253 B2 | 12/2014 | Fisse |
| 8,931,060 B2 | 1/2015 | Bidare |
| 8,934,380 B2 | 1/2015 | Coupland et al. |
| 8,935,175 B2 | 1/2015 | Willner et al. |
| 8,935,176 B2 | 1/2015 | Willner et al. |
| 8,938,395 B2 | 1/2015 | Willner et al. |
| 8,944,910 B1 | 2/2015 | Boyle |
| 8,959,034 B2 | 2/2015 | Jiang et al. |
| 8,984,630 B2 | 3/2015 | Shulman et al. |
| 9,002,320 B2 | 4/2015 | Jiang et al. |
| 9,014,661 B2 | 4/2015 | Decharms |
| 9,014,693 B2 | 4/2015 | Strittmatter |
| 9,020,858 B2 | 4/2015 | Jiang et al. |
| 9,020,859 B2 | 4/2015 | Anand |
| 9,031,877 B1 | 5/2015 | Santhana et al. |
| 9,049,196 B1 | 6/2015 | Black |
| 9,049,596 B1 | 6/2015 | Kronrod |
| 9,060,012 B2 | 6/2015 | Eisen |
| 9,071,600 B2 | 6/2015 | Alagha et al. |
| 9,088,602 B2 | 7/2015 | Barriga et al. |
| 9,092,823 B2 | 7/2015 | Stahlberg |
| 9,094,521 B2 | 7/2015 | Lingafelt et al. |
| 9,107,076 B1 | 8/2015 | Zang et al. |
| 9,112,850 B1 | 8/2015 | Eisen |
| 9,121,215 B2 | 9/2015 | Raynal |
| 9,129,287 B2 | 9/2015 | Hanson et al. |
| 9,135,787 B1 | 9/2015 | Russell et al. |
| 9,141,971 B2 | 9/2015 | Linden et al. |
| 9,147,184 B2 | 9/2015 | Dickelman |
| 9,166,987 B2 | 10/2015 | Sun |
| 9,195,985 B2 | 11/2015 | Domenica et al. |
| 9,205,335 B2 | 12/2015 | McDonald et al. |
| 9,230,158 B1 | 1/2016 | Ramaswamy |
| 9,237,167 B1 | 1/2016 | Manion et al. |
| 9,251,522 B2 | 2/2016 | O'Sullivan et al. |
| 9,275,228 B2 | 3/2016 | Niemela et al. |
| 9,286,637 B1 | 3/2016 | Keld et al. |
| 9,294,923 B2 | 3/2016 | Meacham et al. |
| 9,298,806 B1 | 3/2016 | Vessenes et al. |
| 9,300,467 B2 | 3/2016 | Viswanathan et al. |
| 9,311,672 B2 | 4/2016 | Hochstatter et al. |
| 9,313,326 B2 | 4/2016 | Dessouky et al. |
| 9,331,856 B1 | 5/2016 | Song |
| 9,338,148 B2 | 5/2016 | Polehn et al. |
| 9,342,806 B2 | 5/2016 | Urban |
| 9,342,823 B2 | 5/2016 | Casares et al. |
| 9,351,124 B1 | 5/2016 | Shelton |
| 9,367,857 B2 | 6/2016 | Linden et al. |
| 9,380,030 B2 | 6/2016 | Ezell et al. |
| 9,390,383 B2 | 7/2016 | Harik |
| 9,397,985 B1 | 7/2016 | Seger, II et al. |
| 9,406,032 B2 | 8/2016 | Salonen |
| 9,413,735 B1 | 8/2016 | Hird |
| 9,419,988 B2 | 8/2016 | Alexander |
| 9,426,180 B2 | 8/2016 | Brookins et al. |
| 9,436,935 B2 | 9/2016 | Hudon |
| 9,445,274 B2 | 9/2016 | Haberkorn |
| 9,455,997 B2 | 9/2016 | Shulman et al. |
| 9,460,452 B2 | 10/2016 | O'Sullivan et al. |
| 9,467,475 B2 | 10/2016 | Faltyn et al. |
| 9,473,533 B2 | 10/2016 | Faltyn et al. |
| 9,480,188 B2 | 10/2016 | Orsini et al. |
| 9,509,690 B2 | 11/2016 | Carter et al. |
| 9,513,627 B1 | 12/2016 | Elazary et al. |
| 9,519,903 B2 | 12/2016 | Kannan et al. |
| 9,520,023 B2 | 12/2016 | Lyons et al. |
| 9,521,161 B2 | 12/2016 | Reumann et al. |
| 9,521,551 B2 | 12/2016 | Eisen et al. |
| 9,532,227 B2 | 12/2016 | Richards et al. |
| 9,535,160 B2 | 1/2017 | Bardout |
| 9,544,317 B2 | 1/2017 | Kondapalli et al. |
| 9,565,212 B2 | 2/2017 | Faltyn et al. |
| 9,569,767 B1 | 2/2017 | Lewis et al. |
| 9,569,771 B2 | 2/2017 | Lesavich et al. |
| 9,569,779 B2 | 2/2017 | Cama et al. |
| 9,600,651 B1 | 3/2017 | Ryan et al. |
| 9,603,023 B2 | 3/2017 | Ferguson et al. |
| 9,608,829 B2 | 3/2017 | Spanos et al. |
| 9,626,679 B2 | 4/2017 | Bhorania et al. |
| 9,626,680 B1 | 4/2017 | Ryan et al. |
| 9,635,000 B1 | 4/2017 | Muftic |
| 9,641,338 B2 | 5/2017 | Sriram et al. |
| 9,661,502 B2 | 5/2017 | Abramov et al. |
| 9,665,734 B2 | 5/2017 | Kaditz et al. |
| 9,667,427 B2 | 5/2017 | Oberhauser et al. |
| 9,667,600 B2 | 5/2017 | Piqueras Jover et al. |
| 9,674,218 B2 | 6/2017 | Turgeman |
| 9,681,303 B2 | 6/2017 | Haberkorn |
| 9,681,305 B2 | 6/2017 | Colegate et al. |
| 9,693,263 B2 | 6/2017 | Grootwassink et al. |
| 9,699,660 B1 | 7/2017 | Blatt et al. |
| 9,702,582 B2 | 7/2017 | Svendsen |
| 9,703,986 B1 | 7/2017 | Ashley et al. |
| 9,705,682 B2 | 7/2017 | Kaliski, Jr. et al. |
| 9,705,851 B2 | 7/2017 | Kaliski, Jr. et al. |
| 9,710,808 B2 | 7/2017 | Slepinin |
| 9,747,586 B1 | 8/2017 | Frolov et al. |
| 9,747,598 B2 | 8/2017 | Mogollon et al. |
| 9,749,140 B2 | 8/2017 | Oberhauser et al. |
| 9,749,297 B2 | 8/2017 | Gvili |
| 9,760,574 B1 | 9/2017 | Zhai et al. |
| 9,760,827 B1 | 9/2017 | Lin et al. |
| 9,763,093 B2 | 9/2017 | Richards et al. |
| 9,767,520 B2 | 9/2017 | Isaacson et al. |
| 9,774,578 B1 | 9/2017 | Ateniese et al. |
| 9,779,232 B1 | 10/2017 | Paczkowski et al. |
| 9,779,403 B2 | 10/2017 | Ranganath et al. |
| 9,781,132 B2 | 10/2017 | Ramakrishnan |
| 9,785,369 B1 | 10/2017 | Ateniese et al. |
| 9,785,988 B2 | 10/2017 | Petri et al. |
| 9,786,015 B1 | 10/2017 | Roumeliotis |
| 9,792,101 B2 | 10/2017 | Boudville |
| 9,792,818 B2 | 10/2017 | Aggarwal et al. |
| 9,794,074 B2 | 10/2017 | Toll et al. |
| 9,794,295 B2 | 10/2017 | Brookins et al. |
| 9,805,381 B2 | 10/2017 | Frank et al. |
| 9,807,106 B2 | 10/2017 | Daniel et al. |
| 2002/0002475 A1 | 1/2002 | Freedman et al. |
| 2002/0046341 A1 | 4/2002 | Kazaks et al. |
| 2002/0091555 A1 | 7/2002 | Leppink |
| 2002/0116231 A1 | 8/2002 | Hele et al. |
| 2003/0036997 A1 | 2/2003 | Dunne |
| 2003/0051164 A1 | 3/2003 | Patton |
| 2003/0115142 A1 | 6/2003 | Brickell et al. |
| 2003/0182194 A1 | 9/2003 | Choey et al. |
| 2003/0200489 A1 | 10/2003 | Hars |
| 2003/0220860 A1 | 11/2003 | Heytens et al. |
| 2004/0063424 A1 | 4/2004 | Silberstein et al. |
| 2004/0064371 A1 | 4/2004 | Crapo |
| 2004/0128243 A1 | 7/2004 | Kavanagh et al. |
| 2004/0148254 A1 | 7/2004 | Hauser |
| 2004/0203750 A1 | 10/2004 | Cowdrey et al. |
| 2004/0215579 A1 | 10/2004 | Redenbaugh et al. |
| 2004/0224660 A1 | 11/2004 | Anderson |
| 2004/0249747 A1 | 12/2004 | Ramian |
| 2005/0071283 A1 | 3/2005 | Randle et al. |
| 2005/0092826 A1 | 5/2005 | Blackman |
| 2005/0097046 A1 | 5/2005 | Singfield |
| 2005/0138469 A1 | 6/2005 | Ryan, Jr. et al. |
| 2005/0256766 A1 | 11/2005 | Garcia et al. |
| 2005/0278544 A1 | 12/2005 | Baxter |
| 2006/0074757 A1 | 4/2006 | Burdoucci |
| 2006/0095272 A1 | 5/2006 | Mulcahy et al. |
| 2006/0206941 A1 | 9/2006 | Collins |
| 2006/0218079 A1 | 9/2006 | Goldblatt et al. |
| 2006/0224677 A1 | 10/2006 | Ishikawa et al. |
| 2006/0259304 A1 | 11/2006 | Barzilay |
| 2007/0038560 A1 | 2/2007 | Ansley |

(56) References Cited

U.S. PATENT DOCUMENTS

| | | |
|---|---|---|
| 2007/0043577 A1 | 2/2007 | Kasower |
| 2007/0072587 A1 | 3/2007 | Della-Torre |
| 2007/0073519 A1 | 3/2007 | Long |
| 2007/0083463 A1 | 4/2007 | Kraft |
| 2007/0129999 A1 | 6/2007 | Zhou et al. |
| 2007/0133768 A1 | 6/2007 | Singh |
| 2007/0136573 A1 | 6/2007 | Steinberg |
| 2007/0174082 A1 | 7/2007 | Singh |
| 2007/0198411 A1 | 8/2007 | Kavanagh et al. |
| 2007/0204033 A1 | 8/2007 | Bookbinder et al. |
| 2007/0250919 A1 | 10/2007 | Shull |
| 2007/0255821 A1 | 11/2007 | Ge et al. |
| 2007/0294127 A1 | 12/2007 | Zivov |
| 2007/0299915 A1 | 12/2007 | Shraim et al. |
| 2008/0004937 A1 | 1/2008 | Chow et al. |
| 2008/0010166 A1 | 1/2008 | Yang et al. |
| 2008/0040286 A1 | 2/2008 | Wei |
| 2008/0046312 A1 | 2/2008 | Shany et al. |
| 2008/0082408 A1 | 4/2008 | Santa Ana |
| 2008/0086638 A1 | 4/2008 | Mather |
| 2008/0127319 A1 | 5/2008 | Galloway et al. |
| 2008/0163128 A1 | 7/2008 | Callanan et al. |
| 2008/0184375 A1 | 7/2008 | Nonaka et al. |
| 2008/0235091 A1 | 9/2008 | Holliday |
| 2008/0288405 A1 | 11/2008 | John |
| 2008/0300972 A1 | 12/2008 | Pujara |
| 2009/0012898 A1 | 1/2009 | Sharma et al. |
| 2009/0025084 A1 | 1/2009 | Siourthas et al. |
| 2009/0064327 A1 | 3/2009 | Stukanov |
| 2009/0099891 A1 | 4/2009 | Cohen et al. |
| 2009/0125719 A1* | 5/2009 | Cochran ............... G06Q 30/02 713/171 |
| 2009/0144139 A1 | 6/2009 | Gaedcke |
| 2009/0144141 A1 | 6/2009 | Dominowska et al. |
| 2009/0177529 A1 | 7/2009 | Hadi |
| 2009/0216831 A1 | 8/2009 | Buckner |
| 2009/0254476 A1 | 10/2009 | Sharma et al. |
| 2009/0307028 A1 | 12/2009 | Eldon et al. |
| 2009/0307778 A1 | 12/2009 | Mardikar |
| 2010/0004942 A1 | 1/2010 | Allen et al. |
| 2010/0022307 A1 | 1/2010 | Steuer et al. |
| 2010/0049552 A1 | 2/2010 | Fini et al. |
| 2010/0123002 A1 | 5/2010 | Capporicci |
| 2010/0123003 A1 | 5/2010 | Olson et al. |
| 2010/0145868 A1 | 6/2010 | Niedermeyer |
| 2010/0223119 A1 | 9/2010 | Klish |
| 2010/0250364 A1 | 9/2010 | Song et al. |
| 2010/0262541 A1 | 10/2010 | Wolfowitz |
| 2011/0004498 A1 | 1/2011 | Readshaw |
| 2011/0004588 A1 | 1/2011 | Leitersdorf et al. |
| 2011/0087535 A1 | 4/2011 | Yoshizawa et al. |
| 2011/0087598 A1 | 4/2011 | Bozeman |
| 2011/0135073 A1 | 6/2011 | Lingafelt et al. |
| 2011/0135081 A1 | 6/2011 | Lingafelt et al. |
| 2011/0187642 A1 | 8/2011 | Faith et al. |
| 2011/0211682 A1 | 9/2011 | Singh et al. |
| 2011/0225064 A1 | 9/2011 | Fou |
| 2011/0225067 A1 | 9/2011 | Dunwoody |
| 2011/0225091 A1 | 9/2011 | Plastina et al. |
| 2011/0238516 A1 | 9/2011 | McAfee |
| 2011/0251913 A1 | 10/2011 | Washington |
| 2011/0267638 A1 | 11/2011 | Ryan, Jr. et al. |
| 2011/0282778 A1 | 11/2011 | Wright et al. |
| 2011/0296009 A1 | 12/2011 | Baranov et al. |
| 2011/0307381 A1 | 12/2011 | Kim et al. |
| 2011/0314116 A1 | 12/2011 | Bayer et al. |
| 2011/0314557 A1 | 12/2011 | Marshall |
| 2012/0041841 A1 | 2/2012 | Hu et al. |
| 2012/0047072 A1 | 2/2012 | Larkin |
| 2012/0096546 A1 | 4/2012 | Dilley et al. |
| 2012/0130792 A1 | 5/2012 | Polk, Jr. et al. |
| 2012/0158477 A1 | 6/2012 | Tennenholtz et al. |
| 2012/0163565 A1 | 6/2012 | Li et al. |
| 2012/0173315 A1* | 7/2012 | Martini ............... G06Q 30/0241 705/14.4 |
| 2012/0173325 A1 | 7/2012 | Johri |
| 2012/0179539 A1 | 7/2012 | Daniels et al. |
| 2012/0197802 A1 | 8/2012 | Smith et al. |
| 2012/0204257 A1 | 8/2012 | O'Connell et al. |
| 2012/0209725 A1 | 8/2012 | Bellinger |
| 2012/0239574 A1 | 9/2012 | Smith et al. |
| 2012/0246076 A1 | 9/2012 | Kobayashi |
| 2012/0295580 A1 | 11/2012 | Corner |
| 2012/0310743 A1 | 12/2012 | Johri |
| 2012/0330743 A1 | 12/2012 | Schul et al. |
| 2013/0031001 A1 | 1/2013 | Frechette et al. |
| 2013/0080248 A1 | 3/2013 | Linden et al. |
| 2013/0085829 A1 | 4/2013 | Kavis et al. |
| 2013/0090939 A1 | 4/2013 | Robinson et al. |
| 2013/0090942 A1 | 4/2013 | Robinson et al. |
| 2013/0102338 A1 | 4/2013 | Lovegreen |
| 2013/0103582 A1 | 4/2013 | Singfield |
| 2013/0110648 A1 | 5/2013 | Raab et al. |
| 2013/0110658 A1 | 5/2013 | Lyman et al. |
| 2013/0110715 A1 | 5/2013 | Buchhop |
| 2013/0117081 A1 | 5/2013 | Wilkins et al. |
| 2013/0132277 A1 | 5/2013 | Naqvi |
| 2013/0144727 A1 | 6/2013 | Morot-Gaudry et al. |
| 2013/0144756 A1 | 6/2013 | Farrarons et al. |
| 2013/0185193 A1 | 7/2013 | Boling et al. |
| 2013/0198063 A1 | 8/2013 | Murray |
| 2013/0198066 A1 | 8/2013 | Wall et al. |
| 2013/0205390 A1 | 8/2013 | Hauck et al. |
| 2013/0253919 A1 | 9/2013 | Gutierrez et al. |
| 2013/0268439 A1 | 10/2013 | Lowe |
| 2013/0275195 A1 | 10/2013 | Gabryelski et al. |
| 2013/0275314 A1 | 10/2013 | Bowles |
| 2013/0304637 A1 | 11/2013 | McCabe et al. |
| 2013/0311371 A1 | 11/2013 | Zhu et al. |
| 2013/0325591 A1 | 12/2013 | Delug |
| 2013/0325680 A1 | 12/2013 | Satyavolu et al. |
| 2013/0340656 A1 | 12/2013 | Rainier |
| 2014/0012763 A1 | 1/2014 | Madden et al. |
| 2014/0037155 A1 | 2/2014 | Faria |
| 2014/0067494 A1 | 3/2014 | Squires |
| 2014/0089070 A1 | 3/2014 | Stockwell et al. |
| 2014/0095212 A1 | 4/2014 | Gloerstad et al. |
| 2014/0164255 A1 | 6/2014 | Daly et al. |
| 2014/0172551 A1 | 6/2014 | Desai et al. |
| 2014/0172552 A1 | 6/2014 | Raab et al. |
| 2014/0188730 A1 | 7/2014 | Murgai et al. |
| 2014/0222616 A1 | 8/2014 | Siemiatkowski et al. |
| 2014/0232863 A1 | 8/2014 | Paliga et al. |
| 2014/0244382 A1 | 8/2014 | Brindley et al. |
| 2014/0278947 A1 | 9/2014 | Raab et al. |
| 2014/0279494 A1 | 9/2014 | Wiesman et al. |
| 2014/0279501 A1 | 9/2014 | Kumar et al. |
| 2014/0279516 A1 | 9/2014 | Rellas et al. |
| 2014/0279534 A1 | 9/2014 | Miles |
| 2014/0281539 A1 | 9/2014 | Faltyn et al. |
| 2014/0282696 A1 | 9/2014 | Mao et al. |
| 2014/0297382 A1* | 10/2014 | Chiussi ............... G06Q 30/0225 705/14.26 |
| 2014/0310095 A1 | 10/2014 | Gupta et al. |
| 2014/0320343 A1 | 10/2014 | Bardout |
| 2014/0324522 A1 | 10/2014 | Wilkins et al. |
| 2014/0324573 A1 | 10/2014 | Raab et al. |
| 2014/0337216 A1 | 11/2014 | Anand |
| 2014/0337224 A1 | 11/2014 | Mohapatra |
| 2014/0344015 A1 | 11/2014 | Puertolas-Montanes et al. |
| 2015/0012433 A1 | 1/2015 | Yang et al. |
| 2015/0019425 A1 | 1/2015 | Kumar et al. |
| 2015/0039513 A1 | 2/2015 | Adjaoute |
| 2015/0046216 A1 | 2/2015 | Adjaoute |
| 2015/0073953 A1 | 3/2015 | Springer et al. |
| 2015/0095146 A1 | 4/2015 | Adjaoute |
| 2015/0100493 A1 | 4/2015 | Carnesi, Sr. |
| 2015/0100497 A1 | 4/2015 | De Jong et al. |
| 2015/0106265 A1 | 4/2015 | Stubblefield et al. |
| 2015/0120543 A1 | 4/2015 | Carnesi, Sr. |
| 2015/0161620 A1 | 6/2015 | Christner |
| 2015/0170112 A1 | 6/2015 | Decastro |
| 2015/0186891 A1 | 7/2015 | Wagner et al. |
| 2015/0193774 A1 | 7/2015 | Wetzel |

(56) References Cited

U.S. PATENT DOCUMENTS

| | | |
|---|---|---|
| 2015/0206106 A1 | 7/2015 | Yago |
| 2015/0206148 A1 | 7/2015 | Cherry et al. |
| 2015/0213451 A1 | 7/2015 | Santhana et al. |
| 2015/0220919 A1 | 8/2015 | Williams |
| 2015/0220930 A1 | 8/2015 | Williams |
| 2015/0221057 A1 | 8/2015 | Raheja et al. |
| 2015/0227929 A1 | 8/2015 | Anand |
| 2015/0235217 A1 | 8/2015 | Perez et al. |
| 2015/0244690 A1 | 8/2015 | Mossbarger |
| 2015/0262077 A1 | 9/2015 | White et al. |
| 2015/0262137 A1 | 9/2015 | Armstrong |
| 2015/0262139 A1 | 9/2015 | Shtylman |
| 2015/0262140 A1 | 9/2015 | Armstrong |
| 2015/0262141 A1 | 9/2015 | Rebernik et al. |
| 2015/0262168 A1 | 9/2015 | Armstrong |
| 2015/0262171 A1 | 9/2015 | Langschaedel et al. |
| 2015/0262172 A1 | 9/2015 | Rebernik |
| 2015/0262176 A1 | 9/2015 | Langschaedel et al. |
| 2015/0262195 A1 | 9/2015 | Bergdale et al. |
| 2015/0262227 A1 | 9/2015 | Messer |
| 2015/0269624 A1 | 9/2015 | Cheng et al. |
| 2015/0278820 A1 | 10/2015 | Meadows |
| 2015/0278887 A1 | 10/2015 | Almond |
| 2015/0279147 A1 | 10/2015 | Illingworth et al. |
| 2015/0294425 A1 | 10/2015 | Benson |
| 2015/0310476 A1 | 10/2015 | Gadwa |
| 2015/0324764 A1 | 11/2015 | Van Rooyen et al. |
| 2015/0332256 A1 | 11/2015 | Minor |
| 2015/0332283 A1 | 11/2015 | Witchey |
| 2015/0339705 A1 | 11/2015 | Raji et al. |
| 2015/0347999 A1 | 12/2015 | Lau et al. |
| 2015/0348169 A1 | 12/2015 | Harris et al. |
| 2015/0356524 A1 | 12/2015 | Pennanen |
| 2015/0356555 A1 | 12/2015 | Pennanen |
| 2015/0363791 A1 | 12/2015 | Raz et al. |
| 2016/0005032 A1 | 1/2016 | Yau et al. |
| 2016/0012445 A1 | 1/2016 | Villa-Real |
| 2016/0012465 A1 | 1/2016 | Sharp |
| 2016/0014605 A1 | 1/2016 | Robinton et al. |
| 2016/0019730 A1 | 1/2016 | Tripathi |
| 2016/0021084 A1 | 1/2016 | Eisen |
| 2016/0021532 A1 | 1/2016 | Schenk et al. |
| 2016/0027229 A1 | 1/2016 | Spanos et al. |
| 2016/0055236 A1 | 2/2016 | Frank et al. |
| 2016/0071108 A1 | 3/2016 | Caldera et al. |
| 2016/0072800 A1 | 3/2016 | Soon-Shiong et al. |
| 2016/0078445 A1 | 3/2016 | Einhorn et al. |
| 2016/0078446 A1 | 3/2016 | Trostle |
| 2016/0092643 A1 | 3/2016 | Hinkle et al. |
| 2016/0092979 A1 | 3/2016 | Wolken et al. |
| 2016/0098702 A1 | 4/2016 | Marshall |
| 2016/0098705 A1 | 4/2016 | Kurapati |
| 2016/0098723 A1 | 4/2016 | Feeney |
| 2016/0098730 A1 | 4/2016 | Feeney |
| 2016/0110818 A1 | 4/2016 | Shemesh et al. |
| 2016/0117471 A1 | 4/2016 | Belt et al. |
| 2016/0140538 A1 | 5/2016 | Einhorn |
| 2016/0140551 A1 | 5/2016 | Einhorn |
| 2016/0140560 A1 | 5/2016 | Einhorn |
| 2016/0140564 A1 | 5/2016 | Einhorn |
| 2016/0140565 A1 | 5/2016 | Einhorn |
| 2016/0140653 A1 | 5/2016 | McKenzie |
| 2016/0150078 A1 | 5/2016 | Joshi et al. |
| 2016/0155101 A1 | 6/2016 | Zelkind et al. |
| 2016/0162901 A1 | 6/2016 | Einhorn |
| 2016/0170996 A1 | 6/2016 | Frank et al. |
| 2016/0170998 A1 | 6/2016 | Frank et al. |
| 2016/0171499 A1 | 6/2016 | Meredith et al. |
| 2016/0180338 A1 | 6/2016 | Androulaki et al. |
| 2016/0188819 A1 | 6/2016 | Subramanian et al. |
| 2016/0189251 A1 | 6/2016 | Dessouky et al. |
| 2016/0189277 A1 | 6/2016 | Davis |
| 2016/0191243 A1 | 6/2016 | Manning |
| 2016/0192166 A1 | 6/2016 | Decharms |
| 2016/0192199 A1 | 6/2016 | Alvarez Dominguez et al. |
| 2016/0196559 A1 | 7/2016 | Einhorn et al. |
| 2016/0203448 A1 | 7/2016 | Metnick et al. |
| 2016/0203485 A1 | 7/2016 | Subramanian et al. |
| 2016/0203522 A1 | 7/2016 | Shiffert et al. |
| 2016/0203572 A1 | 7/2016 | McConaghy et al. |
| 2016/0210450 A1 | 7/2016 | Su |
| 2016/0210626 A1 | 7/2016 | Ortiz et al. |
| 2016/0210633 A1 | 7/2016 | Epelman et al. |
| 2016/0212778 A1 | 7/2016 | Grootwassink et al. |
| 2016/0217436 A1 | 7/2016 | Brama |
| 2016/0217532 A1 | 7/2016 | Slavin |
| 2016/0224803 A1 | 8/2016 | Frank et al. |
| 2016/0224970 A1 | 8/2016 | Pama |
| 2016/0227405 A1 | 8/2016 | Dennis et al. |
| 2016/0253663 A1 | 9/2016 | Clark et al. |
| 2016/0254910 A1 | 9/2016 | Finlow-Bates |
| 2016/0259923 A1 | 9/2016 | Papa et al. |
| 2016/0260031 A1 | 9/2016 | Pace et al. |
| 2016/0260081 A1 | 9/2016 | Zermeno |
| 2016/0260091 A1 | 9/2016 | Tobias |
| 2016/0261411 A1* | 9/2016 | Yau ............... H04L 63/0492 |
| 2016/0267472 A1 | 9/2016 | Lingham et al. |
| 2016/0267474 A1 | 9/2016 | Lingham et al. |
| 2016/0267558 A1 | 9/2016 | Bonnell et al. |
| 2016/0267566 A1 | 9/2016 | Levitt et al. |
| 2016/0267601 A1 | 9/2016 | Kundu |
| 2016/0267605 A1 | 9/2016 | Lingham et al. |
| 2016/0280831 A1 | 9/2016 | Park et al. |
| 2016/0283920 A1 | 9/2016 | Fisher et al. |
| 2016/0283941 A1 | 9/2016 | Andrade |
| 2016/0292396 A1 | 10/2016 | Akerwall |
| 2016/0292672 A1 | 10/2016 | Fay et al. |
| 2016/0292680 A1 | 10/2016 | Wilson, Jr. et al. |
| 2016/0300223 A1 | 10/2016 | Grey et al. |
| 2016/0300233 A1 | 10/2016 | Van |
| 2016/0300234 A1 | 10/2016 | Moss-Pultz et al. |
| 2016/0300252 A1 | 10/2016 | Frank et al. |
| 2016/0304653 A1 | 10/2016 | Kim et al. |
| 2016/0304654 A1 | 10/2016 | Lee et al. |
| 2016/0306982 A1* | 10/2016 | Seger, II ............... H04L 9/14 |
| 2016/0307189 A1 | 10/2016 | Zarakas et al. |
| 2016/0307190 A1 | 10/2016 | Zarakas et al. |
| 2016/0307199 A1 | 10/2016 | Patel et al. |
| 2016/0308890 A1 | 10/2016 | Weilbacher |
| 2016/0311958 A1 | 10/2016 | Kim et al. |
| 2016/0321643 A1 | 11/2016 | Beck et al. |
| 2016/0321751 A1 | 11/2016 | Creighton, IV et al. |
| 2016/0328713 A1 | 11/2016 | Ebrahimi |
| 2016/0330034 A1 | 11/2016 | Back et al. |
| 2016/0335533 A1 | 11/2016 | Davis et al. |
| 2016/0335609 A1 | 11/2016 | Jenkins |
| 2016/0342958 A1 | 11/2016 | Thomas et al. |
| 2016/0342959 A1 | 11/2016 | Thomas et al. |
| 2016/0342976 A1 | 11/2016 | Davis |
| 2016/0342977 A1 | 11/2016 | Lam |
| 2016/0342978 A1 | 11/2016 | Davis et al. |
| 2016/0342980 A1 | 11/2016 | Thomas et al. |
| 2016/0342981 A1 | 11/2016 | Thomas et al. |
| 2016/0342982 A1 | 11/2016 | Thomas et al. |
| 2016/0342983 A1 | 11/2016 | Thomas et al. |
| 2016/0342984 A1 | 11/2016 | Thomas et al. |
| 2016/0342985 A1 | 11/2016 | Thomas et al. |
| 2016/0342986 A1 | 11/2016 | Thomas et al. |
| 2016/0342987 A1 | 11/2016 | Thomas et al. |
| 2016/0342988 A1 | 11/2016 | Thomas et al. |
| 2016/0342989 A1 | 11/2016 | Davis |
| 2016/0342994 A1 | 11/2016 | Davis |
| 2016/0350728 A1 | 12/2016 | Melika et al. |
| 2016/0358158 A1 | 12/2016 | Radocchia et al. |
| 2016/0358165 A1 | 12/2016 | Maxwell |
| 2016/0358169 A1 | 12/2016 | Androulaki et al. |
| 2016/0358184 A1 | 12/2016 | Radocchia et al. |
| 2016/0358186 A1 | 12/2016 | Radocchia et al. |
| 2016/0358187 A1 | 12/2016 | Radocchia et al. |
| 2016/0358253 A1 | 12/2016 | Liao et al. |
| 2016/0358267 A1 | 12/2016 | Arjomand et al. |
| 2016/0358268 A1 | 12/2016 | Verma et al. |
| 2016/0359637 A1 | 12/2016 | Okandan |
| 2016/0364700 A1 | 12/2016 | Chenard et al. |

(56) References Cited

U.S. PATENT DOCUMENTS

| | | |
|---|---|---|
| 2016/0364787 A1 | 12/2016 | Walker et al. |
| 2016/0365978 A1 | 12/2016 | Ganesan et al. |
| 2016/0366168 A1 | 12/2016 | Cazin et al. |
| 2016/0369338 A1 | 12/2016 | Mercolino |
| 2016/0371697 A1 | 12/2016 | Auvenshine et al. |
| 2016/0371771 A1 | 12/2016 | Serrano et al. |
| 2016/0379213 A1 | 12/2016 | Isaacson et al. |
| 2016/0379256 A1 | 12/2016 | Salamon et al. |
| 2016/0379298 A1 | 12/2016 | Isaacson et al. |
| 2016/0379312 A1 | 12/2016 | Arjomand et al. |
| 2016/0379330 A1* | 12/2016 | Powers ............. G06T 1/0028 382/100 |
| 2016/0381560 A1 | 12/2016 | Margaliot |
| 2017/0004559 A1 | 1/2017 | Mihalik et al. |
| 2017/0004563 A1 | 1/2017 | Noviello et al. |
| 2017/0004578 A1 | 1/2017 | Cooper et al. |
| 2017/0005804 A1 | 1/2017 | Zinder |
| 2017/0008992 A1 | 1/2017 | Lee et al. |
| 2017/0011053 A1 | 1/2017 | Hubbard et al. |
| 2017/0011195 A1 | 1/2017 | Arshad et al. |
| 2017/0011392 A9 | 1/2017 | Lingham et al. |
| 2017/0011460 A1 | 1/2017 | Molinari et al. |
| 2017/0011468 A1 | 1/2017 | King |
| 2017/0013047 A1 | 1/2017 | Hubbard et al. |
| 2017/0017936 A1 | 1/2017 | Bisikalo et al. |
| 2017/0017954 A1 | 1/2017 | McDonough et al. |
| 2017/0017955 A1 | 1/2017 | Stern et al. |
| 2017/0017958 A1 | 1/2017 | Scott et al. |
| 2017/0018030 A1 | 1/2017 | Crouspeyre et al. |
| 2017/0019496 A1 | 1/2017 | Orbach |
| 2017/0024738 A1 | 1/2017 | Vaidyanathan |
| 2017/0024817 A1 | 1/2017 | Wager et al. |
| 2017/0024818 A1 | 1/2017 | Wager et al. |
| 2017/0028622 A1 | 2/2017 | Westlind et al. |
| 2017/0031676 A1 | 2/2017 | Cecchetti et al. |
| 2017/0031874 A1 | 2/2017 | Boudville |
| 2017/0033932 A1 | 2/2017 | Truu et al. |
| 2017/0039330 A1 | 2/2017 | Tanner, Jr. et al. |
| 2017/0039599 A1 | 2/2017 | Tunnell et al. |
| 2017/0041148 A1 | 2/2017 | Pearce |
| 2017/0041759 A1 | 2/2017 | Gantert et al. |
| 2017/0042068 A1 | 2/2017 | Orsini et al. |
| 2017/0046651 A1 | 2/2017 | Lin et al. |
| 2017/0046652 A1 | 2/2017 | Haldenby et al. |
| 2017/0046664 A1 | 2/2017 | Haldenby et al. |
| 2017/0046670 A1 | 2/2017 | Arjomand et al. |
| 2017/0046689 A1 | 2/2017 | Lohe et al. |
| 2017/0046693 A1 | 2/2017 | Haldenby et al. |
| 2017/0046698 A1 | 2/2017 | Haldenby et al. |
| 2017/0048209 A1 | 2/2017 | Lohe et al. |
| 2017/0048234 A1 | 2/2017 | Lohe et al. |
| 2017/0048235 A1 | 2/2017 | Lohe et al. |
| 2017/0048272 A1 | 2/2017 | Yamamura et al. |
| 2017/0052676 A1 | 2/2017 | Pulier et al. |
| 2017/0053036 A1 | 2/2017 | Boudville |
| 2017/0053131 A1 | 2/2017 | Modi et al. |
| 2017/0053283 A1 | 2/2017 | Meng et al. |
| 2017/0054611 A1 | 2/2017 | Tiell |
| 2017/0061396 A1 | 3/2017 | Melika et al. |
| 2017/0061404 A1 | 3/2017 | Tunnell et al. |
| 2017/0070778 A1 | 3/2017 | Zerlan |
| 2017/0075877 A1 | 3/2017 | Lepeltier |
| 2017/0075938 A1 | 3/2017 | Black et al. |
| 2017/0075941 A1 | 3/2017 | Finlow-Bates |
| 2017/0076274 A1 | 3/2017 | Royyuru et al. |
| 2017/0076306 A1 | 3/2017 | Snider et al. |
| 2017/0078097 A1 | 3/2017 | Carter et al. |
| 2017/0078493 A1 | 3/2017 | Melika et al. |
| 2017/0083898 A1 | 3/2017 | Sidhu et al. |
| 2017/0083907 A1 | 3/2017 | McDonough et al. |
| 2017/0083911 A1 | 3/2017 | Phillips |
| 2017/0083920 A1 | 3/2017 | Zoldi et al. |
| 2017/0083985 A1 | 3/2017 | Lacoss-Arnold et al. |
| 2017/0083989 A1 | 3/2017 | Brockman et al. |
| 2017/0084118 A1 | 3/2017 | Robinson et al. |
| 2017/0085545 A1 | 3/2017 | Lohe et al. |
| 2017/0085555 A1 | 3/2017 | Bisikalo et al. |
| 2017/0088397 A1 | 3/2017 | Buckman |
| 2017/0091397 A1 | 3/2017 | Shah |
| 2017/0091750 A1 | 3/2017 | Maim |
| 2017/0091756 A1 | 3/2017 | Stern et al. |
| 2017/0098291 A1 | 4/2017 | Code et al. |
| 2017/0103167 A1 | 4/2017 | Shah |
| 2017/0103385 A1 | 4/2017 | Wilson, Jr. et al. |
| 2017/0103390 A1 | 4/2017 | Wilson, Jr. et al. |
| 2017/0103391 A1 | 4/2017 | Wilson, Jr. et al. |
| 2017/0103468 A1 | 4/2017 | Orsini et al. |
| 2017/0103472 A1 | 4/2017 | Shah |
| 2017/0104831 A1 | 4/2017 | Fransen |
| 2017/0109475 A1 | 4/2017 | Kaditz et al. |
| 2017/0109636 A1 | 4/2017 | Marcu et al. |
| 2017/0109637 A1 | 4/2017 | Marcu et al. |
| 2017/0109638 A1 | 4/2017 | Marcu et al. |
| 2017/0109639 A1 | 4/2017 | Marcu et al. |
| 2017/0109640 A1 | 4/2017 | Marcu et al. |
| 2017/0109657 A1 | 4/2017 | Marcu et al. |
| 2017/0109667 A1 | 4/2017 | Marcu et al. |
| 2017/0109668 A1 | 4/2017 | Marcu et al. |
| 2017/0109670 A1 | 4/2017 | Marcu et al. |
| 2017/0109676 A1 | 4/2017 | Marcu et al. |
| 2017/0109728 A1 | 4/2017 | Zarakas et al. |
| 2017/0109729 A1 | 4/2017 | Zarakas et al. |
| 2017/0109735 A1 | 4/2017 | Sheng et al. |
| 2017/0109771 A1 | 4/2017 | Sundman et al. |
| 2017/0109772 A1 | 4/2017 | Sundman et al. |
| 2017/0109814 A1 | 4/2017 | Boudville |
| 2017/0109955 A1 | 4/2017 | Ernest et al. |
| 2017/0111792 A1 | 4/2017 | Correia Fernandes et al. |
| 2017/0115976 A1 | 4/2017 | Mills |
| 2017/0116463 A1 | 4/2017 | Beaudet |
| 2017/0116612 A9 | 4/2017 | Naqvi |
| 2017/0116613 A1 | 4/2017 | Cama et al. |
| 2017/0116693 A1 | 4/2017 | Rae et al. |
| 2017/0118301 A1 | 4/2017 | Kouru et al. |
| 2017/0124535 A1 | 5/2017 | Juels et al. |
| 2017/0124556 A1 | 5/2017 | Seger, II |
| 2017/0124571 A1 | 5/2017 | John |
| 2017/0124647 A1 | 5/2017 | Pierce et al. |
| 2017/0126656 A1* | 5/2017 | Chien ............. H04L 63/101 |
| 2017/0126702 A1 | 5/2017 | Krishnamurthy |
| 2017/0132393 A1 | 5/2017 | Natarajan et al. |
| 2017/0132615 A1 | 5/2017 | Castinado et al. |
| 2017/0132619 A1 | 5/2017 | Miller et al. |
| 2017/0132620 A1 | 5/2017 | Miller et al. |
| 2017/0132621 A1 | 5/2017 | Miller et al. |
| 2017/0132625 A1 | 5/2017 | Kennedy |
| 2017/0132626 A1 | 5/2017 | Kennedy |
| 2017/0132630 A1 | 5/2017 | Castinado et al. |
| 2017/0132634 A1 | 5/2017 | James |
| 2017/0132635 A1 | 5/2017 | Caldera |
| 2017/0132636 A1 | 5/2017 | Caldera |
| 2017/0134161 A1 | 5/2017 | Goeringer et al. |
| 2017/0134162 A1 | 5/2017 | Code et al. |
| 2017/0134280 A1 | 5/2017 | Davis |
| 2017/0134375 A1 | 5/2017 | Wagner |
| 2017/0134937 A1 | 5/2017 | Miller et al. |
| 2017/0140145 A1 | 5/2017 | Shah |
| 2017/0140371 A1 | 5/2017 | Forzley et al. |
| 2017/0140375 A1 | 5/2017 | Kunstel |
| 2017/0140394 A1 | 5/2017 | Cao et al. |
| 2017/0140408 A1 | 5/2017 | Wuehler |
| 2017/0142106 A1 | 5/2017 | Eisen et al. |
| 2017/0142586 A1* | 5/2017 | Shen ............. G06Q 30/02 |
| 2017/0147808 A1 | 5/2017 | Kravitz |
| 2017/0147975 A1 | 5/2017 | Natarajan et al. |
| 2017/0148016 A1 | 5/2017 | Davis |
| 2017/0148021 A1 | 5/2017 | Goldstein et al. |
| 2017/0149560 A1 | 5/2017 | Shah |
| 2017/0149795 A1 | 5/2017 | Day, II |
| 2017/0149819 A1 | 5/2017 | Androulaki et al. |
| 2017/0150939 A1 | 6/2017 | Shah |
| 2017/0154331 A1 | 6/2017 | Voorhees |
| 2017/0155515 A1 | 6/2017 | Androulaki et al. |
| 2017/0161439 A1 | 6/2017 | Raduchel et al. |

(56) References Cited

U.S. PATENT DOCUMENTS

| | | |
|---|---|---|
| 2017/0161517 A1 | 6/2017 | Shah |
| 2017/0161652 A1 | 6/2017 | Porth et al. |
| 2017/0161697 A1 | 6/2017 | Clark et al. |
| 2017/0161733 A1 | 6/2017 | Koletsky et al. |
| 2017/0161747 A1 | 6/2017 | Einhorn et al. |
| 2017/0161762 A1 | 6/2017 | Porth et al. |
| 2017/0161829 A1 | 6/2017 | Mazier |
| 2017/0161833 A1 | 6/2017 | Porth et al. |
| 2017/0163733 A1 | 6/2017 | Grefen et al. |
| 2017/0169125 A1 | 6/2017 | Greco et al. |
| 2017/0169363 A1 | 6/2017 | Salmasi et al. |
| 2017/0169473 A1 | 6/2017 | Boudville |
| 2017/0169800 A1 | 6/2017 | Greco et al. |
| 2017/0173262 A1 | 6/2017 | Veltz |
| 2017/0177855 A1 | 6/2017 | Costa Faidella et al. |
| 2017/0177898 A1 | 6/2017 | Dillenberger |
| 2017/0178127 A1 | 6/2017 | Kravitz |
| 2017/0178128 A1 | 6/2017 | Fourez et al. |
| 2017/0178142 A1 | 6/2017 | Dutt et al. |
| 2017/0178148 A1 | 6/2017 | Ryan et al. |
| 2017/0178236 A1 | 6/2017 | Saigh et al. |
| 2017/0180128 A1 | 6/2017 | Lu |
| 2017/0180130 A1* | 6/2017 | Martin .............. H04L 9/3231 |
| 2017/0180134 A1 | 6/2017 | King |
| 2017/0180211 A1 | 6/2017 | Johnson |
| 2017/0185692 A1 | 6/2017 | Boudville |
| 2017/0185981 A1 | 6/2017 | Emmerson |
| 2017/0185998 A1 | 6/2017 | Jung |
| 2017/0186004 A1 | 6/2017 | Chandramouli et al. |
| 2017/0188232 A1 | 6/2017 | Raleigh et al. |
| 2017/0191688 A1 | 7/2017 | Svendsen |
| 2017/0192994 A1 | 7/2017 | Hong et al. |
| 2017/0193464 A1 | 7/2017 | Sher |
| 2017/0193478 A1 | 7/2017 | Dhurka et al. |
| 2017/0193619 A1 | 7/2017 | Rollins et al. |
| 2017/0195299 A1 | 7/2017 | James et al. |
| 2017/0195336 A1 | 7/2017 | Ouellette |
| 2017/0195397 A1 | 7/2017 | Boudville |
| 2017/0195747 A1 | 7/2017 | Haberman et al. |
| 2017/0199671 A1 | 7/2017 | Tormasov et al. |
| 2017/0200137 A1 | 7/2017 | Vilmont |
| 2017/0200147 A1 | 7/2017 | Ansari |
| 2017/0205102 A1 | 7/2017 | Svendsen |
| 2017/0206382 A1 | 7/2017 | Rodriguez De Castro et al. |
| 2017/0206522 A1 | 7/2017 | Schiatti et al. |
| 2017/0206523 A1 | 7/2017 | Goeringer et al. |
| 2017/0207917 A1 | 7/2017 | Davis |
| 2017/0208635 A1 | 7/2017 | Grootwassink et al. |
| 2017/0210938 A1 | 7/2017 | Ku et al. |
| 2017/0212781 A1 | 7/2017 | Dillenberger et al. |
| 2017/0213198 A1 | 7/2017 | Ochynski |
| 2017/0213209 A1 | 7/2017 | Dillenberger |
| 2017/0213221 A1 | 7/2017 | Kurian et al. |
| 2017/0213287 A1 | 7/2017 | Bruno |
| 2017/0213289 A1 | 7/2017 | Doney |
| 2017/0214522 A1 | 7/2017 | Code et al. |
| 2017/0214675 A1 | 7/2017 | Johnsrud et al. |
| 2017/0214699 A1 | 7/2017 | Johnsrud |
| 2017/0214701 A1 | 7/2017 | Hasan |
| 2017/0219922 A1 | 8/2017 | Ku et al. |
| 2017/0220815 A1 | 8/2017 | Ansari et al. |
| 2017/0220998 A1 | 8/2017 | Horn et al. |
| 2017/0221021 A1 | 8/2017 | Gazetov et al. |
| 2017/0221029 A1 | 8/2017 | Lund et al. |
| 2017/0221032 A1 | 8/2017 | Mazed |
| 2017/0221052 A1 | 8/2017 | Sheng et al. |
| 2017/0221055 A1* | 8/2017 | Carlsson .............. H04L 63/10 |
| 2017/0228371 A1 | 8/2017 | Seger, II |
| 2017/0228557 A1 | 8/2017 | Kaditz et al. |
| 2017/0228705 A1 | 8/2017 | Sandor et al. |
| 2017/0228706 A1 | 8/2017 | Parziale et al. |
| 2017/0228731 A1 | 8/2017 | Sheng et al. |
| 2017/0228734 A1 | 8/2017 | Kurian |
| 2017/0228822 A1 | 8/2017 | Creighton, IV et al. |
| 2017/0228973 A1 | 8/2017 | Ovalle |
| 2017/0228974 A1 | 8/2017 | Ovalle |
| 2017/0228975 A1 | 8/2017 | Ovalle |
| 2017/0230285 A1 | 8/2017 | Crabtree et al. |
| 2017/0230345 A1 | 8/2017 | Piqueras Jover et al. |
| 2017/0230353 A1 | 8/2017 | Kurian et al. |
| 2017/0230375 A1 | 8/2017 | Kurian |
| 2017/0230406 A1 | 8/2017 | Gould et al. |
| 2017/0230791 A1 | 8/2017 | Jones |
| 2017/0232300 A1 | 8/2017 | Tran et al. |
| 2017/0234709 A1 | 8/2017 | Mackie et al. |
| 2017/0235848 A1 | 8/2017 | Van Dusen et al. |
| 2017/0235970 A1 | 8/2017 | Conner |
| 2017/0236094 A1 | 8/2017 | Shah |
| 2017/0236102 A1 | 8/2017 | Biton |
| 2017/0236103 A1 | 8/2017 | Biton |
| 2017/0236104 A1 | 8/2017 | Biton |
| 2017/0236120 A1 | 8/2017 | Herlihy et al. |
| 2017/0236121 A1 | 8/2017 | Lyons et al. |
| 2017/0236123 A1 | 8/2017 | Ali et al. |
| 2017/0236143 A1 | 8/2017 | Code et al. |
| 2017/0236177 A1 | 8/2017 | Sebastian et al. |
| 2017/0236196 A1 | 8/2017 | Isaacson et al. |
| 2017/0236365 A1 | 8/2017 | Ovalle |
| 2017/0236368 A1 | 8/2017 | Ovalle |
| 2017/0237553 A1 | 8/2017 | Sriram et al. |
| 2017/0237554 A1 | 8/2017 | Jacobs et al. |
| 2017/0237569 A1 | 8/2017 | Vandervot |
| 2017/0237570 A1 | 8/2017 | Vandervort |
| 2017/0237700 A1 | 8/2017 | Rahaman |
| 2017/0238072 A1 | 8/2017 | Mackie et al. |
| 2017/0242987 A1 | 8/2017 | Williams et al. |
| 2017/0243025 A1 | 8/2017 | Kurian et al. |
| 2017/0243177 A1 | 8/2017 | Johnsrud et al. |
| 2017/0243179 A1 | 8/2017 | Dehaeck et al. |
| 2017/0243193 A1 | 8/2017 | Manian et al. |
| 2017/0243208 A1 | 8/2017 | Kurian et al. |
| 2017/0243209 A1 | 8/2017 | Johnsrud et al. |
| 2017/0243212 A1 | 8/2017 | Castinado et al. |
| 2017/0243213 A1 | 8/2017 | Castinado et al. |
| 2017/0243214 A1 | 8/2017 | Johnsrud et al. |
| 2017/0243215 A1 | 8/2017 | Sifford et al. |
| 2017/0243216 A1 | 8/2017 | Kohn |
| 2017/0243217 A1 | 8/2017 | Johnsrud et al. |
| 2017/0243222 A1 | 8/2017 | Balasubramanian |
| 2017/0243239 A1 | 8/2017 | El-Eid et al. |
| 2017/0243241 A1 | 8/2017 | Boutelle et al. |
| 2017/0243284 A1 | 8/2017 | Rubman et al. |
| 2017/0243286 A1 | 8/2017 | Castinado et al. |
| 2017/0243287 A1 | 8/2017 | Johnsrud et al. |
| 2017/0244707 A1 | 8/2017 | Johnsrud et al. |
| 2017/0244720 A1 | 8/2017 | Kurian et al. |
| 2017/0244721 A1 | 8/2017 | Kurian et al. |
| 2017/0244757 A1 | 8/2017 | Castinado et al. |
| 2017/0244909 A1 | 8/2017 | Dannen |
| 2017/0249623 A1 | 8/2017 | Cole |
| 2017/0250004 A1 | 8/2017 | Ovalle |
| 2017/0250005 A1 | 8/2017 | Ovalle |
| 2017/0250796 A1 | 8/2017 | Samid |
| 2017/0250972 A1 | 8/2017 | Ronda et al. |
| 2017/0251025 A1 | 8/2017 | Varley et al. |
| 2017/0255912 A1 | 9/2017 | Casebolt |
| 2017/0255995 A1 | 9/2017 | Kay et al. |
| 2017/0256000 A1 | 9/2017 | Isaacson et al. |
| 2017/0256001 A1 | 9/2017 | Isaacson et al. |
| 2017/0256003 A1 | 9/2017 | Isaacson et al. |
| 2017/0257358 A1 | 9/2017 | Ebrahimi et al. |
| 2017/0262778 A1 | 9/2017 | Ganesan |
| 2017/0262862 A1 | 9/2017 | Aljawhari |
| 2017/0262879 A1 | 9/2017 | Elizondo Castillo et al. |
| 2017/0262902 A1 | 9/2017 | Weston et al. |
| 2017/0264428 A1 | 9/2017 | Seger, II |
| 2017/0265789 A1 | 9/2017 | Naseri et al. |
| 2017/0270435 A1 | 9/2017 | Gallardo |
| 2017/0270492 A1 | 9/2017 | Donovan et al. |
| 2017/0270493 A1 | 9/2017 | Lugli et al. |
| 2017/0270509 A1 | 9/2017 | Colegate et al. |
| 2017/0270527 A1 | 9/2017 | Rampton |
| 2017/0278080 A1 | 9/2017 | Kruszka et al. |
| 2017/0278186 A1 | 9/2017 | Creighton, IV et al. |

(56) References Cited

U.S. PATENT DOCUMENTS

| | | |
|---|---|---|
| 2017/0279774 A1 | 9/2017 | Booz et al. |
| 2017/0279783 A1 | 9/2017 | Milazzo et al. |
| 2017/0279818 A1 | 9/2017 | Milazzo et al. |
| 2017/0285720 A1 | 10/2017 | Shah |
| 2017/0286717 A1 | 10/2017 | Khi et al. |
| 2017/0286880 A1 | 10/2017 | Wiig et al. |
| 2017/0286951 A1 | 10/2017 | Ignatchenko et al. |
| 2017/0287068 A1 | 10/2017 | Nugent |
| 2017/0287090 A1 | 10/2017 | Hunn et al. |
| 2017/0287592 A1 | 10/2017 | Ovalle |
| 2017/0289111 A1 | 10/2017 | Voell et al. |
| 2017/0289134 A1 | 10/2017 | Bradley et al. |
| 2017/0291295 A1 | 10/2017 | Gupta et al. |
| 2017/0293503 A1 | 10/2017 | Curtis |
| 2017/0293669 A1 | 10/2017 | Madhavan et al. |
| 2017/0293898 A1 | 10/2017 | Rampton |
| 2017/0293912 A1 | 10/2017 | Furche et al. |
| 2017/0295021 A1 | 10/2017 | Aranda Gutierrez et al. |
| 2017/0295023 A1 | 10/2017 | Madhavan et al. |
| 2017/0295157 A1 | 10/2017 | Chavez et al. |
| 2017/0295180 A1 | 10/2017 | Day et al. |
| 2017/0295232 A1 | 10/2017 | Curtis |
| 2017/0300627 A1 | 10/2017 | Giordano et al. |
| 2017/0300872 A1 | 10/2017 | Brown et al. |
| 2017/0300876 A1 | 10/2017 | Musiala, Jr. et al. |
| 2017/0300898 A1 | 10/2017 | Campero et al. |
| 2017/0300905 A1 | 10/2017 | Withrow et al. |
| 2017/0300910 A1 | 10/2017 | Bethke, II et al. |
| 2017/0300928 A1 | 10/2017 | Radocchia et al. |
| 2017/0300946 A1 | 10/2017 | Wilkinson et al. |
| 2017/0300978 A1 | 10/2017 | Narasimhan et al. |
| 2017/0301033 A1 | 10/2017 | Brown et al. |
| 2017/0301047 A1 | 10/2017 | Brown et al. |
| 2017/0302450 A1 | 10/2017 | Ebrahimi |
| 2017/0302460 A1 | 10/2017 | Song et al. |
| 2017/0303132 A1 | 10/2017 | Naqvi |
| 2017/0307387 A1 | 10/2017 | Kohlhepp |
| 2017/0308070 A1 | 10/2017 | Elazary et al. |
| 2017/0308893 A1 | 10/2017 | Saraniecki |
| 2017/0308920 A1 | 10/2017 | Tsuchiya |
| 2017/0308928 A1 | 10/2017 | Weston et al. |
| 2017/0309117 A1 | 10/2017 | Clemenson et al. |
| 2017/0310484 A1 | 10/2017 | Kaliski, Jr. et al. |
| 2017/0310653 A1 | 10/2017 | Zhang |
| 2017/0310747 A1 | 10/2017 | Cohn et al. |
| 2017/0316162 A1 | 11/2017 | Warner et al. |
| 2017/0316390 A1 | 11/2017 | Smith et al. |
| 2017/0316391 A1 | 11/2017 | Peikert et al. |
| 2017/0316409 A1 | 11/2017 | Smith et al. |
| 2017/0316410 A1 | 11/2017 | Smith et al. |
| 2017/0316487 A1 | 11/2017 | Mazed |
| 2017/0316497 A1 | 11/2017 | Song et al. |
| 2017/0317833 A1 | 11/2017 | Smith et al. |
| 2017/0317834 A1 | 11/2017 | Smith et al. |
| 2017/0317997 A1 | 11/2017 | Smith et al. |
| 2017/0323294 A1 | 11/2017 | Rohlfing et al. |
| 2017/0323392 A1 | 11/2017 | Kasper et al. |
| 2017/0324738 A1 | 11/2017 | Hari et al. |
| 2018/0011867 A1* | 1/2018 | Bowman ............... G06F 16/278 |
| 2018/0049008 A1 | 2/2018 | Han |
| 2018/0150749 A1* | 5/2018 | Wu ....................... G06F 40/279 |
| 2018/0357047 A1* | 12/2018 | Brown .................. G06N 3/082 |
| 2019/0228176 A1* | 7/2019 | Fishbeck ............. G06F 21/6209 |
| 2019/0236214 A1* | 8/2019 | Kokernak ............. H04N 21/478 |
| 2020/0034842 A1* | 1/2020 | Ponniah .............. G06Q 40/025 |
| 2020/0044844 A1* | 2/2020 | Sridhara .............. H04W 12/108 |
| 2020/0052905 A1* | 2/2020 | Mathias ............... H04L 9/0861 |
| 2020/0074091 A1* | 3/2020 | Jain ..................... H04L 9/0631 |
| 2020/0118163 A1* | 4/2020 | Sohum ................ G06Q 30/0261 |
| 2020/0186355 A1* | 6/2020 | Davies ................. H04L 9/3247 |
| 2021/0209247 A1* | 7/2021 | Mohassel ............ A63B 21/222 |

FOREIGN PATENT DOCUMENTS

| | | |
|---|---|---|
| EP | 0 714 219 A2 | 5/1996 |
| EP | 0 838 123 B1 | 5/2000 |
| EP | 1 075 123 A1 | 2/2001 |
| EP | 1 068 581 B1 | 8/2002 |
| EP | 1 267 312 A1 | 12/2002 |
| EP | 1 282 059 A1 | 5/2003 |
| EP | 1 450 321 A1 | 8/2004 |
| EP | 1 172 770 B1 | 9/2004 |
| EP | 0 891 069 B1 | 10/2004 |
| EP | 1 500 021 | 1/2005 |
| EP | 1 072 165 B1 | 7/2005 |
| EP | 0 884 919 B1 | 10/2005 |
| EP | 1 209 935 B1 | 10/2005 |
| EP | 1 076 951 B1 | 3/2006 |
| EP | 1 040 674 B1 | 5/2006 |
| EP | 1 770 615 A1 | 4/2007 |
| EP | 1 771 031 A2 | 4/2007 |
| EP | 1 816 595 A1 | 8/2007 |
| EP | 1 527 552 B1 | 3/2008 |
| EP | 1 894 158 A2 | 3/2008 |
| EP | 2 043 328 A2 | 4/2009 |
| EP | 1 670 268 B1 | 10/2009 |
| EP | 2 194 500 A1 | 6/2010 |
| EP | 2 219 149 A1 | 8/2010 |
| EP | 1 872 603 B1 | 1/2011 |
| EP | 1 701 500 B1 | 2/2011 |
| EP | 2 104 901 B1 | 2/2011 |
| EP | 2 312 542 A1 | 4/2011 |
| EP | 2 409 455 | 1/2012 |
| EP | 2 485 184 A1 | 8/2012 |
| EP | 2 541 480 A1 | 1/2013 |
| EP | 1 579 393 B1 | 2/2013 |
| EP | 2 611 106 A1 | 7/2013 |
| EP | 2 646 930 | 10/2013 |
| EP | 2 831 718 | 10/2013 |
| EP | 2 665 026 A1 | 11/2013 |
| EP | 2 333 582 B1 | 12/2013 |
| EP | 2 677 465 A1 | 12/2013 |
| EP | 2 691 790 | 2/2014 |
| EP | 2 752 042 | 7/2014 |
| EP | 2 127 453 B1 | 8/2014 |
| EP | 2 770 690 A1 | 8/2014 |
| EP | 2 779 070 A1 | 9/2014 |
| EP | 2 965 250 | 9/2014 |
| EP | 2 973 284 | 10/2014 |
| EP | 2 989 603 | 10/2014 |
| EP | 3 017 618 | 1/2015 |
| EP | 3 022 958 | 1/2015 |
| EP | 2 718 528 B1 | 4/2015 |
| EP | 2 330 840 B1 | 12/2015 |
| EP | 2 953 076 A1 | 12/2015 |
| EP | 3 149 882 | 12/2015 |
| EP | 2 975 874 A1 | 1/2016 |
| EP | 2 602 983 B1 | 8/2016 |
| EP | 3 073 670 A1 | 9/2016 |
| EP | 3 078 654 A1 | 10/2016 |
| EP | 3 078 687 A1 | 10/2016 |
| EP | 3 078 689 A1 | 10/2016 |
| EP | 3 078 690 A1 | 10/2016 |
| EP | 3 078 694 A1 | 10/2016 |
| EP | 3 078 695 A1 | 10/2016 |
| EP | 2 756 703 B1 | 11/2016 |
| EP | 3 096 279 A1 | 11/2016 |
| EP | 3 107 022 A1 | 12/2016 |
| EP | 2 691 789 B1 | 1/2017 |
| EP | 3 136 277 A1 | 3/2017 |
| EP | 3 160 078 A1 | 4/2017 |
| EP | 3 160 176 A1 | 4/2017 |
| EP | 3 188 441 A1 | 7/2017 |
| EP | 3 193 299 A1 | 7/2017 |
| EP | 3 125 489 B1 | 8/2017 |
| EP | 3 203 403 A1 | 8/2017 |
| EP | 3 214 861 A1 | 9/2017 |
| EP | 3 226 165 A1 | 10/2017 |
| EP | 3 226 169 A1 | 10/2017 |
| EP | 3 229 418 A1 | 10/2017 |
| EP | 3 236 374 A1 | 10/2017 |

(56) References Cited

FOREIGN PATENT DOCUMENTS

| | | |
|---|---:|---|
| EP | 3 236 401 A1 | 10/2017 |
| EP | 3 236 403 A2 | 10/2017 |
| EP | 3 242 265 A1 | 11/2017 |
| JP | 2018-028745 A | 2/2018 |
| KR | 10-2015-0131239 A | 11/2015 |
| KR | 10-1661933 B1 | 9/2016 |
| KR | 10-2016-0126291 A | 11/2016 |
| KR | 10-1814989 B1 | 1/2018 |
| WO | 2008/030670 A1 | 3/2008 |
| WO | 2009/077193 A2 | 6/2009 |

OTHER PUBLICATIONS https://brunch.co.kr/@mobiinside/1052, May 23, 2018.
International Search Report dated Dec. 18, 2019, issued in International Application No. PCT/KR2019/010794.

\* cited by examiner

100

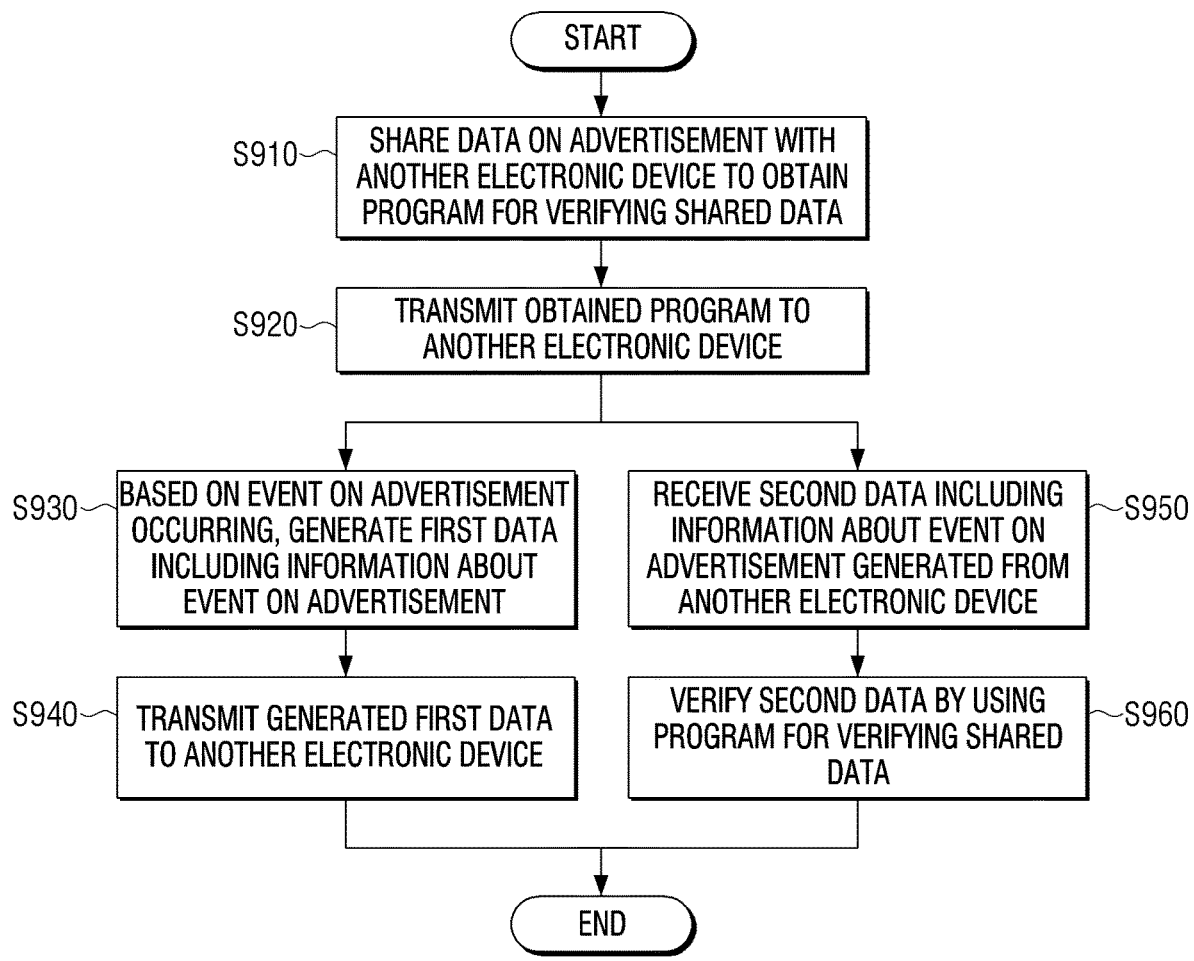

ONLINE FRAUD PREVENTION AND DETECTION BASED ON DISTRIBUTED SYSTEM

CROSS-REFERENCE TO RELATED APPLICATION(S)

This application is a U.S. National Stage application under 35 U.S.C. § 371 of an International application number PCT/KR2019/010794, filed on Aug. 23, 2019, which is based on and claimed priority of a Korean patent application number 10-2018-0108862, filed on Sep. 12, 2018, in the Korean Intellectual Property Office, the disclosure of each of which is incorporated by reference herein in its entirety.

TECHNICAL FIELD

The disclosure relates to an electronic device and a method for controlling the same. More particularly, in terms of a digital advertisement system, the disclosure relates to an electronic device for building a distribution system which may be trusted between a plurality of electronic devices and a method for controlling the same.

In addition, the disclosure relates to an artificial intelligence (AI) system which simulates cognitive function, determination function, or the like of a human brain by utilizing a machine learning algorithm and an application thereof.

BACKGROUND ART

An artificial intelligence (AI) system may be a computer system which realizes intelligence of a human level, and unlike a rule based smart system according to the related art, it is a system in which a machine self learns and determines on its own. Because the artificial intelligence system is configured so that recognition rate increases the more it is used and user preference is more accurately understood, rule based smart systems according to the related art are gradually being replaced with deep learning based artificial intelligence systems.

The artificial intelligence technology may be comprised of machine learning (deep learning) and element technologies utilizing machine learning.

Machine learning may be an algorithm technology which classifies/learns features of input data on its own, and element technology may be technology which utilizes machine learning algorithms such as deep learning and may be comprised of technical fields such as linguistic understanding, visual understanding, inference/prediction, knowledge representation, and motion control.

The various fields in which artificial intelligence technology may be applied is described in the following. Linguistic understanding is a technique in which language/character of humans is recognized and applied/processed, and may include natural language processing, machine translation, dialog system, question and answer, speech recognition/synthesis, and the like. Visual understanding is a technique that processes things as recognized visually by a human, and includes object recognition, object tracking, image search, human recognition, scene understanding, space understanding, image enhancement, and the like. Inference prediction is a technique that determines information by logical inference and prediction, and includes knowledge/likelihood based inference, optimization prediction, preference based planning, recommendation and the like. Knowledge representation is a technique that automatically processes experience information of humans to knowledge data, and includes knowledge construction (generating/classifying data), knowledge management (utilizing data), and the like. Motion control is a technique for controlling the autonomous driving of a vehicle and the movement of a robot, and includes movement control (navigation, collision, driving), manipulation control (behavior control), and the like.

An advertisement system according to the related art has mainly been based on terrestrial broadcasting. Recently, with the development of internet technology, the digital advertisement market is growing increasingly. However, in the case of the digital advertisement market according to the related art, in many cases, because service is provided based on trust between an advertiser, an advertisement platform, and advertisement media, there are many instances where it is difficult to verify a malicious act of any one from among the advertiser, the advertisement platform, and the advertisement media. Furthermore, when comparing with advertisements received through terrestrial broadcasting according to the related art, because the number of advertisement media is too many in the digital advertisement market, there is the problem of detecting malicious acts by the multiple advertisement media in its entirety.

DISCLOSURE

Technical Problem

Aspects of the disclosure are to address at least the above-mentioned problems and/or disadvantages and to provide an electronic device capable of sharing a program which is capable of verifying data and data related to a program which is capable of verifying data between shared electronic devices, and verifying the shared data, and a method for controlling the same.

Technical Solution

According to an embodiment, a method for controlling an electronic device includes sharing data on an advertisement with another electronic device to obtain a program for verifying the shared data, transmitting the obtained program to the another electronic device, generating, based on an event on an advertisement occurring, a first data including information on the event with respect to the advertisement, transmitting the generated first data to the another electronic device, receiving a second data including information on the event with respect to the advertisement generated from the another electronic device, and verifying the second data by using the program.

The first data may be data encrypted by using a unique key information in the electronic device.

The verifying may further include decrypting the second data, and verifying the second data by comparing information on an event included in the decrypted second data and information on an event included in the first data.

The first data or the second data may include at least one from among time information at which the first data or the second data is generated, information of the electronic device or the another electronic device, and time information at which the first data or the second data is shared with the another electronic device.

The second data may include information on data input from an external electronic device with which the program is not shared, the control method may include inputting the second data to a trained artificial intelligence model to obtain reliability of the second data, and the artificial intelligence model may be an artificial intelligence model trained to verify reliability of data received from the external electronic device.

The trained artificial intelligence model may include being periodically trained by using data identified as fraud data by the electronic device and the another electronic device as learning data.

Based on the electronic device being an electronic device generating advertisement data, the first data may include at least one from among identification information on the advertisement data, time information at which the advertisement data is generated, and time information at which the generated advertisement data is transmitted to the another electronic device.

Based on the electronic device being an advertisement platform electronic device, the first data may include at least one from among identification information on an another electronic device which generates advertisement data, and time information at which the second data which is generated from another electronic device that generates the advertisement data is received.

Based on the electronic device being an advertisement media electronic device, the first data may include at least one from among identification information on an another electronic device generating advertisement data, time information at which the advertisement data is disclosed, and information on the advertisement data of an external electronic device based on the advertisement data being used from the external electronic device with which the program is not shared.

According to an embodiment, an electronic device includes a memory, a communicator, and a processor configured to share data on an advertisement with an another electronic device and obtain a program to verify the shared data, transmit the obtained program to the another electronic device through the communicator, generate, based on an event on an advertisement occurring, first data including information on the event with respect to the advertisement, and transmit the generated first data to the another electronic device through the communicator, and the processor is configured to receive, through the communicator, second data including information on the event on the advertisement generated from the another electronic device, and use the program to verify the second data.

The first data may be encrypted data using a unique key information in the electronic device.

The processor may be configured to decrypt the second data, verify the second data by comparing information on an event included in the decrypted second data and information on an event included in the first data.

The first data or the second data may include at least one from among time information at which the first data or the second data is generated, information of the electronic device or the another electronic device, and time information at which the first data or the second data is shared with the another electronic device.

The second data may include information on data input from an external electronic device with which the program is not shared, the processor may be configured to input the second data to a trained artificial intelligence model and obtain reliability of the second data, and the artificial intelligence model may be an artificial intelligence model trained to verify reliability of data received from the external electronic device.

The trained artificial intelligence model may be periodically trained by using data identified as fraud data by the electronic device and the another electronic device as learning data.

Based on the electronic device being an electronic device generating advertisement data, the first data may include at least one from among identification information on the advertisement data, time information at which the advertisement data is generated, and time information at which the generated advertisement data is transmitted to the another electronic device.

Based on the electronic device being an advertisement platform electronic device, the first data may include at least one from among identification information on an another electronic device which generates advertisement data, and time information at which the second data which is generated from another electronic device that generates the advertisement data is received.

Based on the electronic device being an advertisement media electronic device, the first data may include at least one from among identification information on an another electronic device generating advertisement data, time information at which the advertisement data is disclosed, and information on the advertisement data of an external electronic device based on the advertisement data being used from the external electronic device with which the program is not shared.

Effect of Invention

According to the above-mentioned various embodiments of the disclosure, the electronic device and the another electronic device may verify and share data with each other and build a trusted system.

DESCRIPTION OF DRAWINGS

FIG. 9 is a flowchart illustrating a control method of an electronic device according to an embodiment.

DETAILED DESCRIPTION OF EXEMPLARY EMBODIMENTS

Figure 1:
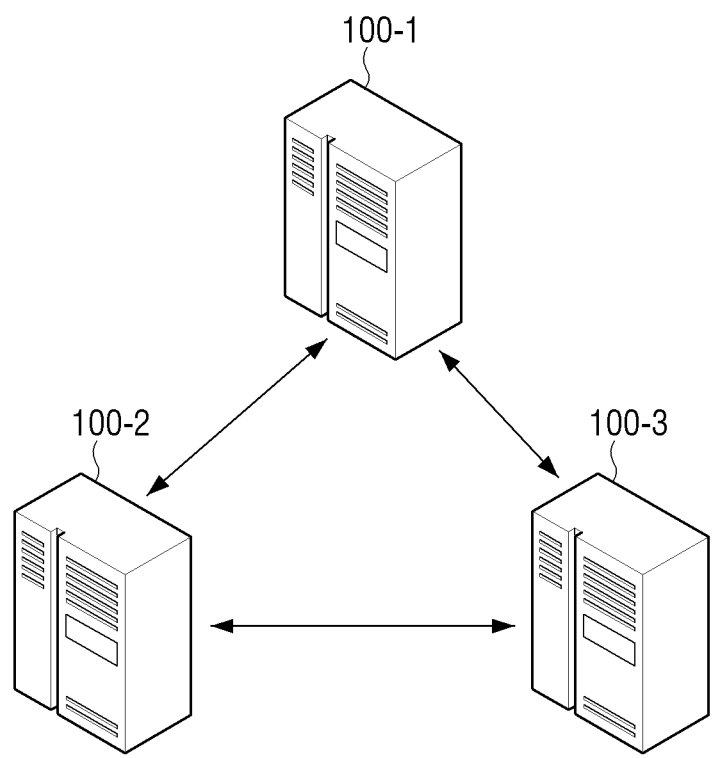
FIG. 1 is an example view illustrating a system according to an embodiment.

Various embodiments of the disclosure will be described herein with reference to the accompanying drawings. However, it should be noted that the various embodiments are not for limiting the scope of the disclosure to a specific embodiment, but should be interpreted to include all modifications, equivalents and/or alternatives of the embodiments. In describing the embodiments, like reference numerals may be used to refer to like elements.

Expressions such as "comprise," "may comprises," "include," or "may include" and the like used herein may designate a presence of a characteristic (e.g., element such as number, function, operation or component), and not preclude a presence of other characteristics.

In the disclosure, expressions such as "A or B," "at least one from among A and/or B," or "one or more of A and/or B" may include all possible combinations of the items listed together. For example, "A or B," "at least one from among A and B," or "at least one from among A or B" may refer to all cases including (1) at least one from among A, (2) at least one from among B, or (3) both of at least one from among A and at least one from among B.

Expressions such as "first," "second," "1st," "2nd," or so on used in the disclosure may modify various elements regardless of order and/or importance, and may be used only to distinguish one element from another, but not limit the corresponding elements.

When a certain element (e.g., first element) is indicated as being "(operatively or communicatively) coupled with/to" or "connected to" another element (e.g., second element), it may be understood as the certain element being directly coupled with/to the other element or as being coupled through another element (e.g., third element). On the other hand, when a certain element (e.g., first element) is indicated as "directly coupled with/to" or "directly connected to" another element (e.g., second element), it may be understood as another element (e.g., third element) not being present between the certain element and the other element.

The expression "configured to . . . (or set up to)" used in the disclosure may be used interchangeably with, for example, "suitable for . . . ," "having the capacity to . . . ," "designed to . . . ," "adapted to . . . ," "made to . . . ," or "capable of . . . " based on circumstance. The term "configured to . . . (or set up to)" may not necessarily mean "specifically designed to" in terms of hardware. Rather, in a certain circumstance, the expression "a device configured to . . . " may mean something that the device "may perform . . . " together with another device or components. For example, the phrase "a sub-processor configured to (or set up to) perform A, B, or C" may mean a dedicated processor for performing a corresponding operation (e.g., embedded processor), or a generic-purpose processor (e.g., a central processing unit (CPU) or an application processor) capable of performing the corresponding operations by executing one or more software programs stored in the memory device.

An electronic device in accordance with various embodiments of the disclosure may include at least one from among, for example, and without limitation, a smartphone, a tablet personal computer (PC), a mobile phone, a video telephone, an electronic book reader, a desktop PC, a laptop PC, a netbook computer, a workstation, a server, a personal digital assistance (PDA), a portable multimedia player (PMP), a MP3 player, a medical device, a camera, or a wearable device. The wearable device may include at least one from among an accessory type (e.g., a watch, a ring, a bracelet, an anklet, a necklace, a pair of glasses, a contact lens or a head-mounted-device (HMD)), a fabric or a garment-embedded type (e.g., an electronic clothing), a skin-attached type (e.g., a skin pad or a tattoo), or a bio-implantable circuit. In some embodiments, the electronic device may include at least one from among, for example, and without limitation, a television, a digital video disk (DVD) player, an audio, a refrigerator, a cleaner, an oven, a microwave, a washing machine, an air purifier, a set top box, a home automation control panel, a security control panel, a media box (e.g., Samsung HomeSync™, Apple TV™, or Google TV™), a game console (e.g., Xbox™ PlayStation™), an electronic dictionary, an electronic key, a camcorder, an electronic frame, or the like.

In another embodiment, the electronic device may include at least one from among various medical devices (e.g., various portable medical measurement devices (e.g., a glucose measuring device, a heart rate measuring device, a blood pressure measuring device, a temperature measuring device, etc.), a magnetic resonance angiography (MRA), a magnetic resonance imaging (MRI), a computed tomography (CT), an imaging apparatus, an ultrasonic device, etc.), a navigation device, a global navigation satellite system (GNSS), an event data recorder (EDR), a flight data recorder (FDR), a vehicle infotainment device, a nautical electronic equipment (e.g., nautical navigation device, gyro compass, etc.), an avionics electronic device, a security device, a vehicle head unit, an industrial or personal robot, a drone, an automated teller machine (ATM) of financial institutions, a point of sales (POS) of shops, or an internet of things device (e.g., light bulbs, various sensors, sprinkler devices, fire alarms, temperature adjusters, street lights, toasters, exercise equipment, hot water tanks, heater, boilers, etc.).

In this disclosure, the term 'user' may refer to a person using an electronic device or a device (e.g., artificial intelligence electronic device) that uses an electronic device.

The disclosure will be described in greater detail below with reference to the accompanied drawings.

FIG. 1 is an example view illustrating a system according to an embodiment.

Basically, a digital advertisement system may be comprised of an advertiser, an advertisement platform, and an advertisement media. The advertiser may mean an entity which publishes an advertisement, and may perform a role as paying a cost to the advertisement platform and the advertisement media. The advertisement platform may be a configuration for performing a function of selecting an advertisement such as an advertisement recommendation and transferring advertisement data provided by the advertiser to the advertisement media. The advertisement media may be a configuration for performing the role of transferring the advertisement received from the advertiser or the advertisement platform to a client. The advertisement media may, when a predetermined specific act occurs, identify as the client having viewed the advertisement and charge a cost on the corresponding act to the advertiser. The predetermined specific act may be varied such as, for example, and without limitation, the act of clicking an advertisement exposed to the advertisement media, the act of viewing an advertisement exposed to the advertisement media for a certain time or more, the act of receiving download of an application related to an advertisement exposed to the advertisement media, or the like.

Because of acts of advertisement fraud (Ad Fraud or Fraud) by a variety of methods, there are instances of the advertiser being made to pay a cost on an advertisement which has not actually been exposed. The acts of advertisement fraud may be varied such as, for example, and without limitation, the act of click spamming, the act of click injection, the act of fake install, or the like. The click spamming may refer to the act of the advertisement platform or advertisement media falsely transmitting a signal to the advertiser that the advertisement, which was not actually exposed, has been exposed. The click injection may refer to an act of falsely transferring a signal to the advertiser that the advertisement has been exposed, when there is an act by the advertisement platform or the advertisement media achieving an objective of the advertisement regardless of the advertisement. For example, based on an advertisement an application for downloading the application being registered in the advertisement platform or the advertisement media, the advertisement platform or the advertisement media may charge a cost to the advertiser when the client downloads the corresponding application after viewing the advertisement on the application. However, the advertisement platform or the advertisement media by the act of click injection may charge a cost to the advertiser based on the act of receiving download of the application (through another route) without viewing the advertisement on the application. The fake install may refer to an act of charging a cost to the advertiser by deceiving that the advertisement has been exposed to the client without an act by the client related to the advertisement exposure.

In order to prevent the above-mentioned various acts of fraud, a distribution system which may form trust between the advertiser, the advertisement platform and the advertisement media is required. To this end, according to an embodiment of the disclosure, as illustrated in FIG. 1, a distribution verification and agreement system may be formed between the advertiser, the advertisement platform and the advertisement media. Technically, a distribution verification and agreement system between the electronic device (hereinafter, first electronic device 100-1) managed by the advertiser, the electronic device (hereinafter, second electronic device 100-2) managed by the advertisement platform, and the electronic device (hereinafter, third electronic device 100-3) managed by the advertisement media may be built to prevent malicious acts between the first electronic device to the third electronic device.

The first electronic device 100-1 may obtain a program for verifying data on an advertisement which is to be shared with the second electronic device 100-2 and the third electronic device 100-3, and may share the obtained program with the second electronic device 100-2 and the third electronic device 100-3. The program for verifying data on the advertisement may include rules on a publishing entity of the advertisement data, conditions for exposing the advertisement, cost payment information on exposure, and the like. The condition for exposing the advertisement may be a condition for exposing the advertisement for a specific period or in a specific media. The cost payment information on exposure may be information on a type of advertisement exposure (e.g., homepage banner click, advertisement views, act of downloading a specific application after viewing the advertisement). Further, the program for verifying data on the advertisement may further include information on acts of various advertisement fraud.

Based on the second electronic device 100-2 allocating an advertisement to the third electronic device 100-3, the second electronic device 100-2 may share data on the allocated advertisement with the first electronic device 100-1 and the third electronic device 100-3. The data on the allocated advertisement may be data including time information at which the advertisement data received from the first electronic device 100-1 is registered and approved, and data on the publishing entity with respect to the advertisement data. Specifically, the data on the allocated advertisement may be time information at which the advertisement data received from the first electronic device 100-1 is registered and approved, and data which encrypts (e.g., encryption using Sign or Hash value) data on the publishing entity with respect to the advertisement data.

The third electronic device 100-3 may receive advertisement data from the second electronic device 100-2 and expose to the client. The third electronic device 100-3 may generate data including information on the time the advertisement was exposed to the client, information on the act of cost payment (click, download, etc.) by the program rule, exposure verification information, and the like and share with the first electronic device 100-1 and the second electronic device 100-2.

The first electronic device to the third electronic device 100-1 to 100-3 may be generated from each of the electronic devices and may verify shared data by using a shared program. Further, the first electronic device to the third electronic device 100-1 to 100-3 may agree on whether the shared data is a normal data based on the respective verification results. When the shared data is identified as normal data from each of the electronic devices by the agreement, the first electronic device to the third electronic device 100-1 to 100-3 may perform a function according to the rules of the shared program.

Figure 2:
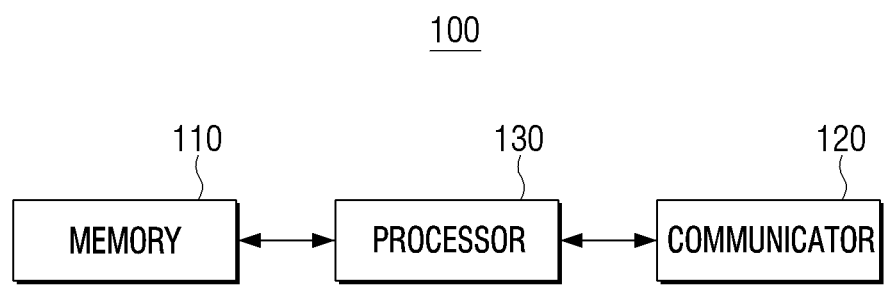
FIG. 2 is a block diagram illustrating in brief a configuration of an electronic device according to an embodiment.

FIG. 2 is a block diagram illustrating in brief a configuration of an electronic device according to an embodiment.

In general, the electronic device 100 illustrated in FIG. 2 is described based on the first electronic device 100-1, but the second electronic device 100-2 and the third electronic device 100-3 may also be the electronic device 100 of the disclosure.

The electronic device 100 may include a memory 110, a communicator 120, and a processor 130.

The memory 110 may store an instruction or data related to at least one other elements of the electronic device 100. The memory 110 may be implemented as a non-volatile memory, a volatile memory, a flash-memory, a hard disk drive (HDD), a solid state drive (SSD), or the like. The memory 110 may be accessed by the processor 130 and reading/writing/modifying/deleting/updating of data by the processor 130 may be performed. In the disclosure, the term 'memory' may include the memory 110, a read only memory (ROM; not shown) in the processor 130, a random access memory (RAM; not shown), or a memory card (not shown; e.g., a micro SD card, a memory stick) mounted to the electronic device 100.

The memory 110 may share data on the advertisement with another electronic device and store a second data including a program for verifying the shared data, a first data including event information on the advertisement, and event information on the advertisement generated from the another electronic device. The first data may include at least one from among identification information on the advertisement data, time information at which the advertisement data is generated, and time information at which the generated advertisement data was transmitted to the second electronic device 100-2, and the second data may include at least one from among identification information on the first electronic device 100-1, and time information at which the first data generated from the first electronic device 100-1 is received.

The communicator 120 may be a configuration for performing communication with the another electronic device. The communicator 120 being communicatively coupled with the another electronic device may include communicating through a third device (e.g., a relay, a hub, an access point, a server, a gateway, etc.). The wireless communication may include a cellular communication which uses at least one from among, for example, and without limitation, a long term evolution (LTE), an LTE advance (LTE-A), a code division multiple access (CDMA), a wideband CDMA (WCDMA), a universal mobile telecommunications system (UMTS), a wireless broadband (WiBro), a global system for mobile communications (GSM), or the like. According to an embodiment, the wireless communication may include at least one from among, for example, and without limitation, wireless fidelity (WiFi), Bluetooth, Bluetooth low energy (BLE), ZigBee, near field communication (NFC), magnetic secure transmission, radio frequency (RF) or body area network (BAN). The wired communication may include at least one from among, for example, and without limitation, a universal serial bus (USB), a high definition multimedia interface (HDMI), a recommended standard 232 (RS-232), a power line communication, plain old telephone service (POTS), or the like. A network in which the wireless communication or the wired communication is performed may include a telecommunication network, for example, at least one from among a computer network (e.g., local area network (LAN) or wide area network (WAN)), the Internet, or a telephone network.

The communicator 120 may, in order to share at least one from among the data on the advertisement, the first data, and the second data with the another electronic device, transmit at least one from among the data on the advertisement and the first data to the another electronic device or receive the second data generated in the another electronic device.

The processor 130 may be electrically coupled with the memory 110 and control the overall operation and function of the electronic device 100.

The processor 130 may be configured to share data on the advertisement with another electronic device and obtain a program for verifying the shared data. The program for verifying the shared data may include rules on the publishing entity of the advertisement data, conditions for exposing the advertisement, cost payment information on the exposure, and the like.

The processor 130 may be configured to transmit the obtained program to the another electronic device. The processor 130 may be configured to, if an event on the advertisement occurs, generate a first data including information on the event with respect to the advertisement, and transmit the generated first data to the another electronic device. The event on the advertisement may be an event for transmitting the advertisement to the second electronic device 100-2 by the first electronic device 100-1, an event for allocating the advertisement to the third electronic device 100-3 by the second electronic device 100-2, an event for receiving information on advertisement exposure from an external electronic device by the third electronic device 100-3, or the like. The external electronic device may refer to an electronic device other than the first electronic device to third electronic device 100-3 which shares the program for verifying shared data, the first data, the second data, and the like.

The processor 130 may be configured to receive the second data including information on the event on the advertisement generated from the another electronic device. The processor 130 may be configured to verify the received second data by using the obtained program. Further, the processor 130 may be configured to agree with the another electronic device on whether the second data is normal data based on the verification result.

The first data may be data which is encrypted by using a unique key information of the electronic device 100. In an embodiment, the processor 130 may be configured to use an asymmetric key encryption method to encrypt the first data and transmit to another electronic device.

Based on receiving the second data, the processor 130 may be configured to decrypt the second data, and compare the information on the event included in the decrypted second data and the information on the event with respect to the first data to verify the second data. The first data and the second data may include at least one from among the time information at which the first data or the second data is generated, the information on the electronic device 100 or the another electronic device, the time information shared by the first data or the second data with the another electronic device.

In an embodiment, the processor 130 may be configured to verify the second data by comparing the time information included in the first data, the information on the another electronic device, with the time information included in the decrypted second data, the information on the another electronic device.

The second data may further include data on the external electronic device to which the program for verifying the shared data is not shared. For example, the external electronic device may be an electronic device of the client consuming the advertisement data, and the data on the external electronic device may be data related to the act of the electronic device of the client (clicking an advertisement banner, downloading application after viewing the advertisement, etc.).

The processor 13 may be configured to input the second data to the trained artificial intelligence model to obtain trust on the second data. The trained artificial intelligence model may be an artificial intelligence model trained to verify a reliability of the data received from the external electronic device. The reliability on the second data may be an indicator for whether the second data is a normal data. That is, the processor 130 may be configured to, by training the artificial intelligence model based on the second data which has completed the agreement and verification, output the reliability of data which is not verified when an unverified data is input to the artificial intelligence model. In addition, the trained artificial intelligence model may be periodically trained by using the data identified as fraud data by the electronic device 100 and the another electronic device as learning data. The trained artificial intelligence model may also be periodically trained by using data identified as not fraud data by the electronic device 100 and the another electronic device as learning data.

Based on the electronic device 100 according to the disclosure being an electronic device (first electronic device 100-1) which generates advertisement data, the first data may include at least one from among identification information on the advertisement data, time information at which the advertisement data is generated, and time information at which the generated advertisement data is transmitted to the another electronic device.

In addition, based on the electronic device 100 according to the disclosure being an advertisement platform electronic device (second electronic device 100-2), the first data may include at least one from among the identification information on the first electronic device 100-1 which generates advertisement data, and time information at which the second data which is generated from the first electronic device 100-1 is received.

In addition, based on the electronic device 100 according to the disclosure being an advertisement media electronic device (third electronic device 100-3), the first data may include at least one from among the identification information on the first electronic device 100-1 which generates advertisement data, time information at which the advertisement data is disclosed, and user information on the advertisement data of the external electronic device based on the advertisement data being used by the external electronic device which does not share the program.

Figure 3:
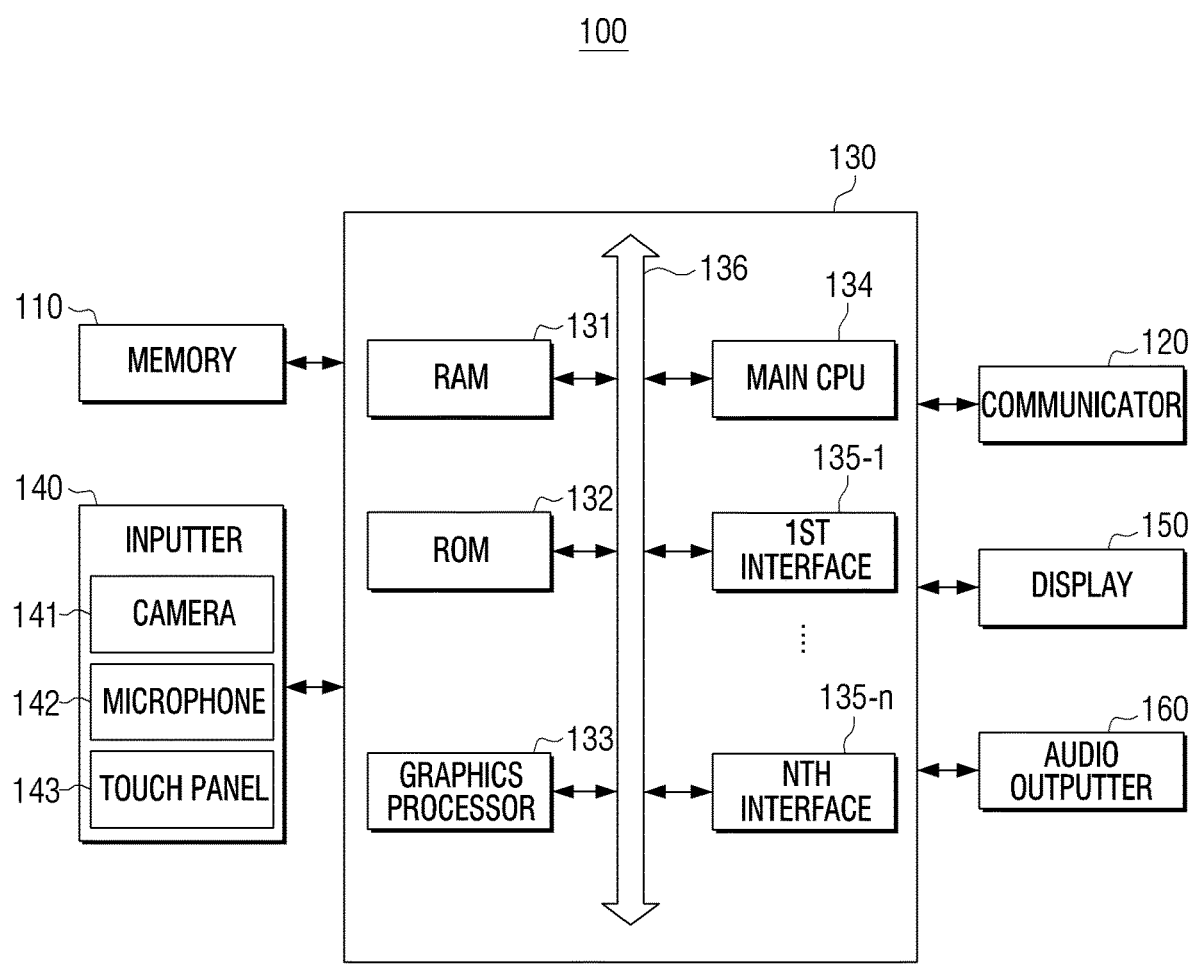
FIG. 3 is a block diagram illustrating in detail a configuration of an electronic device according to an embodiment.

FIG. 3 is a block diagram illustrating in detail a configuration of an electronic device according to an embodiment.

As illustrated in FIG. 3, the electronic device 100 may further include an inputter 140, a display 150, and an audio outputter 160 in addition to the memory 110, the communicator 120, and the processor 130. However, the embodiment is not limited to the above-mentioned configurations, and some configurations may be added or omitted if necessary.

The inputter 140 may be a configuration for receiving input of a user command. The inputter 140 may include a camera 141, a microphone 142, a touch panel 143, and the like. The camera 141 may be a configuration for obtaining image data of the surroundings of the electronic device 100. The camera 141 may capture a still image or a moving image. For example, the camera 141 may include one or more image sensors (e.g., front-surface sensor or a back-surface sensor), lens, an image signal processor (ISP), or a flash (e.g., LED, xenon lamp, etc.). The microphone 142 may be a configuration for obtaining sounds surrounding the electronic device 100. The microphone 142 may be a configuration for obtaining the sounds surrounding the electronic device 100. The microphone 142 may receive input of an external acoustic signal and generate an electric speech information. The microphone 142 may use various noise removal algorithms for removing noise generated in the process of receiving an external acoustic signal. The touch panel 143 may be a configuration capable of receiving input of various user inputs. The touch panel 143 may receive data by the user operation. The touch panel 143 may be configured by being coupled with a display which will be described below. The inputter 140 may be of a variety of configurations for receiving various data in addition to the above-described camera 141, microphone 142, and the touch panel 143.

The display 150 may be a configuration for outputting a variety of images. The display 150 for providing a variety of images may be implemented as a display panel of various forms. For example, the display panel may be implemented with various display technologies such as, for example, and without limitation, a liquid crystal display (LCD), an organic light emitting diodes (OLED), an active-matrix organic light-emitting diodes (AM-OLED), a liquid crystal on silicon (LcoS), a digital light processing (DLP), or the like. In addition, the display 150 may be in a flexible display form and may be coupled to at least one from among a front-surface area, a side-surface area, and a back-surface area of the electronic device 100.

The audio outputter 160 may be a configuration which outputs not only various audio data to which various processing operations such as decoding, amplifying, and noise filtering have been performed by the audio processor, but also various notification sounds or voice messages. The audio processor may be an element which performs processing on audio data. In the audio processor, various processing such as decoding, amplifying, or noise filtering with respect to the audio data may be performed. The audio data processed in the audio processor may be output to the audio outputter 160. The audio outputter may be implemented as a speaker, but this is merely one embodiment, and may be implemented as a output terminal capable of outputting audio data.

As described above, the processor 130 may be configured to control the overall operation of the electronic device 100. The processor 130 may be configured to include a RAM 131, a ROM 132, a main central processing unit (CPU) 133, a graphics processor 134, a 1st to nth interface 135-1 to 135-n, and a bus 136. The RAM 131, the ROM 132, the main CPU 133, the graphics processor 134, the first to nth interface 135-1 to 135-n, and the like may be interconnected through the bus 136.

In the ROM 132, an instruction set or the like for booting the system may be stored. When the turn-on instruction is input and power is supplied, the main CPU 133 may copy an operating system (O/S) stored in the memory to the RAM 131 based on the instruction stored in the ROM 132, execute the O/S, and boot the system. When booting is completed, the main CPU 133 may copy a variety of application programs stored in the memory to the RAM 131, and execute the application programs copied to the RAM 131 to perform a variety of operations.

The main CPU 133 may access the memory 110, and use the O/S stored in the memory 110 to perform booting. The main CPU 123 may use the various programs, content, data or the like stored in the memory 110 to perform various operations.

The 1st to nth interface 135-1 to 135-n may be connected to the various elements described above. One from among the interfaces may become a network interface which connects with the external device through a network.

Various embodiments of the disclosure will be described below with reference to FIGS. 4 to 8.

Figure 4:
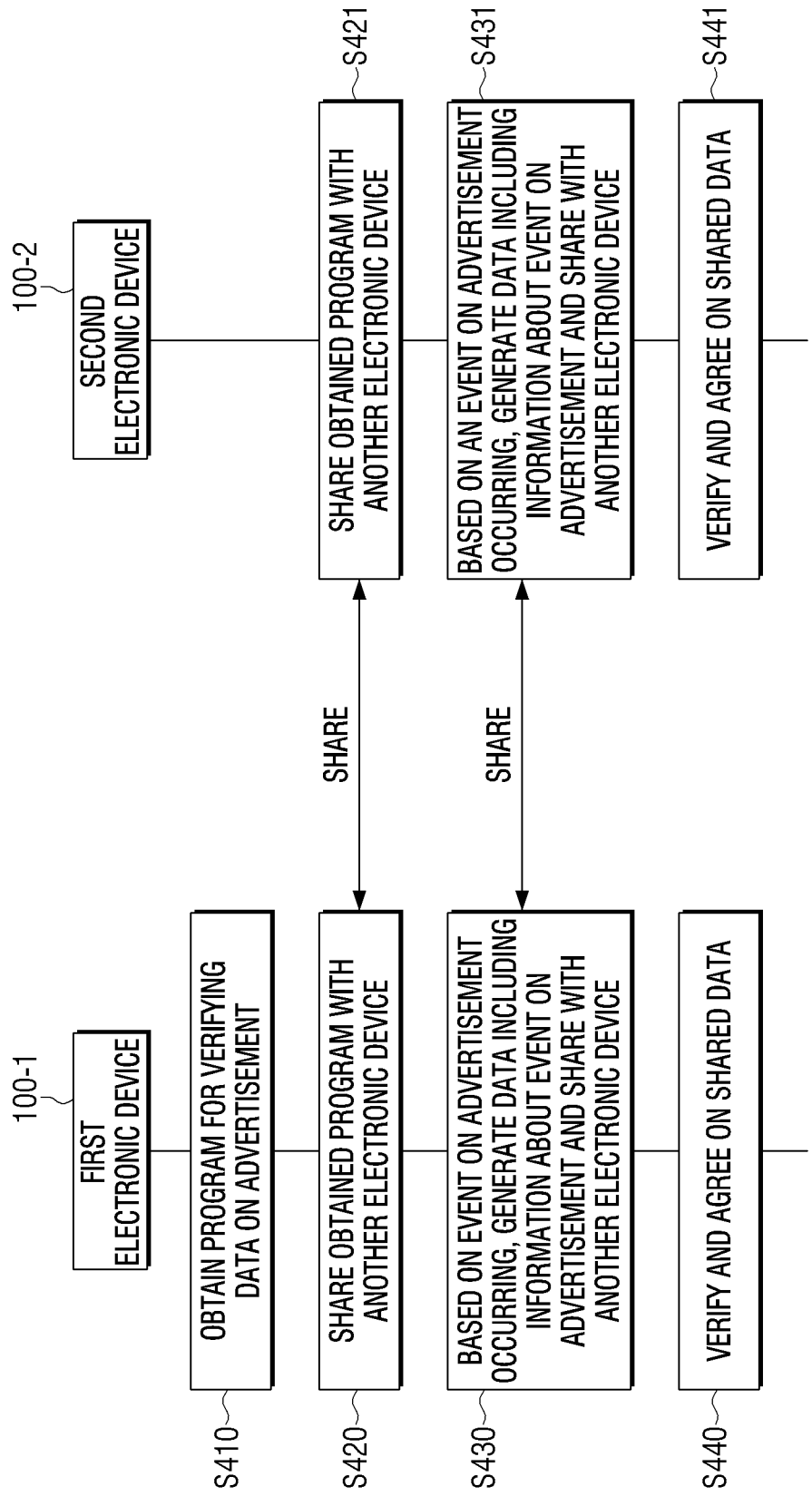
FIG. 4 is a flowchart illustrating an operation of a system comprised of an electronic device and another electronic device according to an embodiment.

FIG. 4 is a flowchart illustrating an operation of a system comprised of an electronic device and another electronic device according to an embodiment.

First the electronic device 100 may obtain a program for verifying data on the advertisement (S410). The electronic device 100 may be the first electronic device 100-1, but is not limited thereto, and may be the second electronic device 100-2 or the third electronic device 100-3 if necessary. As described above, the program for verifying data on the advertisement may include rules on the publishing entity of the advertisement data, conditions for exposing the advertisement, cost payment information on exposure, or the like.

The electronic device 100 may share the obtained program with the another electronic device (S420). The another electronic device which received the shared program may be at least one from among the second electronic device 100-2 and the third electronic device 100-3. The another electronic device may receive the shared program from the electronic device 100 (S421).

The electronic device 100 may, based on an event on the advertisement occurring, generate data including information on the event with respect to the advertisement and share with the another electronic device (S430). Likewise, the another electronic device may also, based on an event on the advertisement occurring, generate data including information on the event with respect to the advertisement and share with the another electronic device (S431). The event on the advertisement may include an event for transmitting the advertisement to the second electronic device 100-2 by the first electronic device 100-1, an event for allocating the advertisement to the third electronic device 100-3 by the second electronic device 100-2, an event for receiving information on the advertisement exposure from the external electronic device by the third electronic device 100-3, or the like.

The electronic device 100 may verify and agree on the shared data (S440). Based on receiving shared data including information on the advertisement from the another electronic device, the electronic device 100 may verify the shared data and agree on the verified data. The another electronic device may also verify and agree by receiving shared data including data on the advertisement from the electronic device 100 (S441). That is, the electronic device 100 and the another electronic device may each verify the shared data, and based on the verifying that the shared data is normal data, the shared data may be agreed to be identified as normal data. Alternatively, the electronic device 100 and the another electronic device may each verify the shared data, and based on verifying that the shared data is abnormal data, the shared data may be agreed to be identified as abnormal data.

Figure 5:
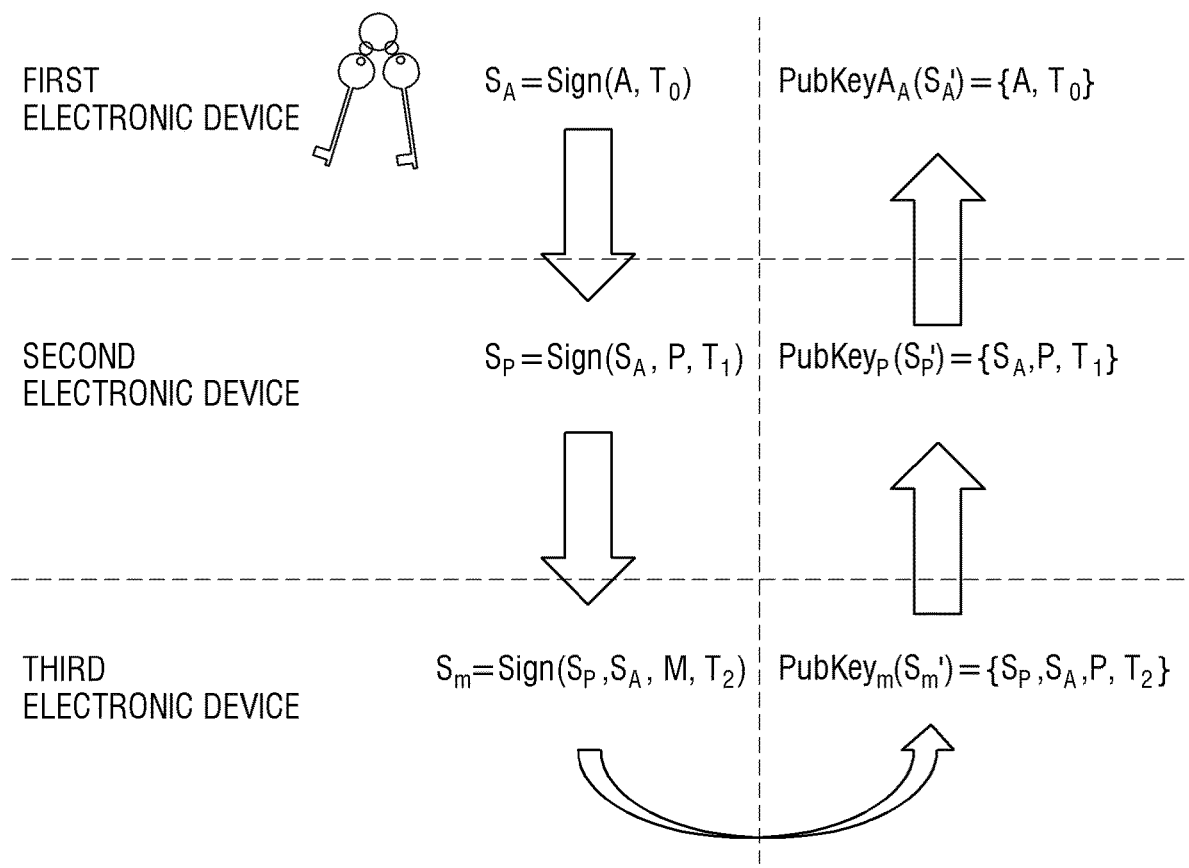
FIG. 5 is an example view illustrating a method for verifying shared data according to an embodiment.

FIG. 5 is an example view illustrating a method for verifying shared data according to an embodiment.

As illustrated in FIG. 5, the electronic device 100 may identify whether the data is normal data through an encryption method which uses an asymmetric encryption key.

Based on event A occurring, the first electronic device 100-1 may encrypt information T0 on event A and time at which event A occurred with a private key of the first electronic device 100-1 and generate encrypted data Sa. At this time, event A may be an event for transmitting data on the advertisement to the second electronic device 100-2. The first electronic device 100-1 may share the encrypted data Sa with the second electronic device 100-2 and the third electronic device 100-3. Although the first electronic device 100-1 has been described as encrypting only the information T0 on event A and the time at which event A occurred, information on advertisement data to be advertised may be included and encrypted.

The second electronic device 100-2 may receive Sa from the first electronic device 100-1, and based on event P occurring, the second electronic device 100-2 may encrypt the encrypted dataSa, event P, and the time T1 at which event P occurred with a private encryption key of the second electronic device 100-2, and generate an encrypted data Sp. At this time, event P may be an event for transmitting data on the advertisement to the third electronic device 100-3. The second electronic device 100-2 may share the encrypted data Sp with the first electronic device 100-1 and the third electronic device 100-3.

Using the same method, the third electronic device 100-3 may receive the Sp from the second electronic device 100-2, and based on event M occurring, the third electronic device 100-3 may encrypt the encrypted dataSa, Sp event M, and time T2 at which event M occurred with a private encryption key of the third electronic device 100-3 and generate an encrypted data Sm. At this time, event M may be an event exposing the advertisement by the third electronic device 100-3. The third electronic device 100-3 may share the encrypted data Sm with the first electronic device 100-1 and the second electronic device 100-2.

The first electronic device to the third electronic device 100-1 to 100-3 may decrypt encrypted data with a shared key each has, and check whether the decrypted data is normal data.

The third electronic device 100-3 may use its shared key to decrypt the encrypted data. For example, the third electronic device 100-3 may decrypt Sm' to verify data Sm'. As illustrated in FIG. 5, based on the result of decrypting the Sm' being the same as the data prior to encrypting Sm, the third electronic device 100-3 may identify Sm' as normal data.

Using the same method, the second electronic device 100-2 may use its shared key to decrypt the encrypted data. For example, the second electronic device 100-2 may decrypt Sp' to verify data Sp'. As illustrated in FIG. 5, based on the result of decrypting the Sp' being the same as the data prior to encrypting Sp, the second electronic device 100-2 may identify Sp' as normal data.

Using the same method, the first electronic device 100-1 may use its shared key to decrypt the encrypted data. For example, the first electronic device 100-1 may decrypt Sa' to verify data Sa'. As illustrated in FIG. 5, based on the result of decrypting the Sa' being the same as the data prior to encrypting Sa, the first electronic device 100-1 may identify Sa' as normal data. Through the above-mentioned method, the first electronic device to the third electronic device 100-1 to 100-3 may verify the shared data.

In the above-mentioned embodiment, the method of verifying data using an asymmetric key encryption has been described, but the embodiment is not limited thereto. For example, in order to verify data, block chain technology of various forms may be applied.

The electronic device 100 according to the disclosure may as an advertisement media electronic device may be, for example, an electronic device which manages a homepage, an electronic device which is managed by a portal site, or the like, but is not limited thereto. For example, the third electronic device 100-3 according to another embodiment of the disclosure may be a user terminal device. That is, the third electronic device 100-3 may, as an electronic device used by general customers, be comprised of a smartphone, a tablet PC, a digital television (TV), or the like.

Even in cases where the third electronic device 100-3 is the above-described various user terminal devices, the technical idea of the disclosure may be applied. In this case, the third electronic device 100-3 may authenticate the third electronic device 100-3 such as a public key or a device including information capable of identifying a user of the third electronic device 100-3. Based on an advertisement exposure operation (advertisement click, application download after viewing the advertisement, etc.) being performed through the third electronic device 100-3, the third electronic device 100-3 may encrypt data on the advertisement exposure operation and share with the first electronic device 100-1 and the second electronic device 100-2.

Figure 6:
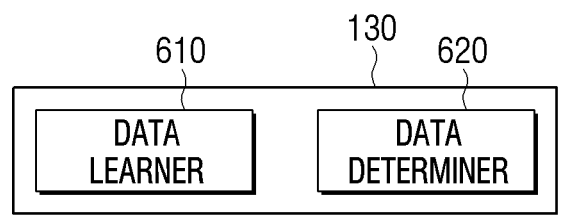
FIG. 6 is an example view illustrating an operation of an electronic device using an artificial intelligence model according to an embodiment.

FIG. 6 is an example view illustrating an operation of an electronic device using an artificial intelligence model according to an embodiment.

The processor 130 may include a data learner 610 and a data determiner 620. The data learner 610 may train a data determining model to have a standard according to a specific objective. The specific objective may include an objective related to speech recognition, translation, image recognition, situation recognition, or the like. Alternatively, the specific objective may include an objective related to data classification, grouping, clustering, or the like. The data learner 610 according to the disclosure may train the data determining model to have an objective for determining the reliability of input data. The data learner 610 may apply the learning data to the data determining model to identify an operation according to the above-described objective, and generate a data determining model having a determination standard. The data determiner 620 may identify the situation with respect to a specific objective based on the input data. The data determiner 620 may use the trained data determining model, and identify a situation from a predetermined input data. The data determiner 620 may obtain the predetermined input data according to a pre-set standard, and by applying the obtained input data to the data determining model as an input value, identify (or, estimate) the predetermined situation based on the predetermined input data. In addition, a result value output by applying the obtained input data to the data determining model as the input value may be used to update the data determining model. The data determiner 620 according to the disclosure may, by applying the input data on the advertisement to the data determining model as an input value, identify the reliability of the input data based on the input data.

At least a part of the data learner 610 and at least a part of the data determiner 620 may be implemented as a software module or manufactured to at least one hardware chip form and mounted to the electronic device. For example, at least one from among the data learner 610 and the data determiner 620 may be manufactured in the form of a dedicated hardware chip for artificial intelligence (AI), or manufactured as a generic-purpose processor (e.g., CPU or application processor) or a part of a graphics dedicated processor (e.g., a graphics processing unit (GPU)) and mounted on the various electronic devices described above. The dedicated hardware chip for artificial intelligence may, as a dedicated processor specializing probability calculation, have a higher parallel processing performance than the generic-purpose processor according to the related art and may quickly process computation tasks in the field of artificial intelligence such as machine learning. When the data learner 610 and the data determiner 620 are implemented as a software module (or, a program module including an instruction), the software module may be stored in a non-transitory computer readable media readable by a computer. In this case, the software module may be provided by an operating system (OS), or provided by a predetermined application. Alternatively, some of the software modules may be provided by the operating system (OS), and the remaining some may be provided by the predetermined application.

Figure 7:
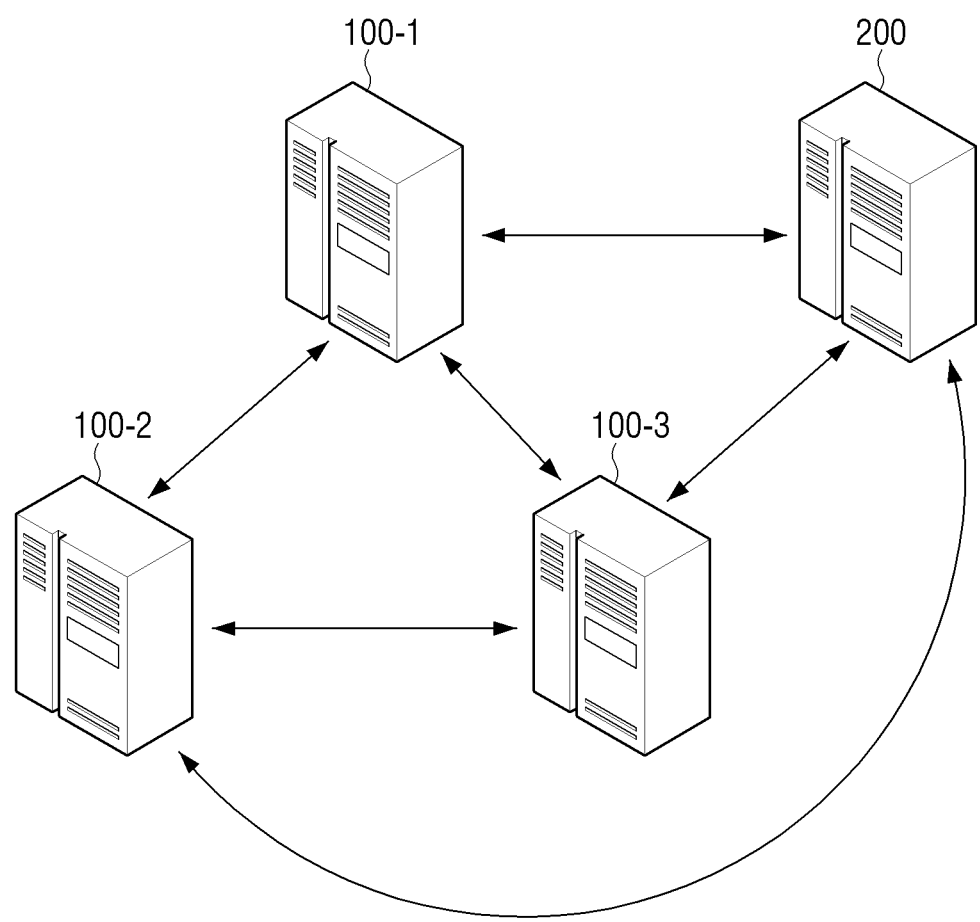
FIG. 7 is an example view illustrating a distribution system between a plurality of electronic devices according to an embodiment.

In this case, the data learner 610 and the data determiner 620 may be mounted to one server, or may be mounted to each of the separate servers. For example, as illustrated in FIG. 7, at least one from among the data learner 610 and the data determiner 620 may be included in the electronic device 100, and the remaining one may be included in an external server 200. The data learner 610 and the data determiner 620 may provide a model information constructed by the data learner 610 to the data determiner 620 via wire or wireless means, and the data input to the data determiner 620 may be provided to the data learner 610 as additional learning data. In another example, the data learner 610 and the data determiner 620 may be an element of the external server 200. In this case, when the electronic device 100 transmits learning data or input data to the external server 200, the external server 200 may transmit a result value on the learning data or the input data received from the electronic device 100 to the electronic device 100.

The data learner 610 may further include a data obtainer, a preprocessor, a learning data selector, a model learner, and a model assessor. The data obtainer may be a configuration for obtaining learning data according to a specific objective. The preprocessor may be a configuration for preprocessing the data obtained from the obtainer to a pre-defined format.

The learning data selector may select data necessary for learning from among the data obtained in the learning data obtainer or the data preprocessed in the learning data preprocessor. The selected learning data may be provided to a model learner. The learning data selector may, based on a pre-set selection standard, select learning data necessary in learning from among the obtained or preprocessed data. In addition, the learning data selector may select learning data according to the pre-set selection standard by the training of the model learner. The learning data selector according to an embodiment of the disclosure may select data which is shared and verified between the first electronic device to the third electronic device 100-3 as learning data. Based on selecting the verified data as the learning data, the trained artificial intelligence model may have a higher accuracy.

The model learner may be a configuration for training the data determining model by using the learning data. The model learner may, based on a pre-constructed data recognition model being present in plurality, identify the data recognition model with a high relevance in basic learning data as with the input learning data as the data recognition model to be learned. In this case, the basic learning data may be pre-classified per data type, and the data recognition model may be pre-constructed per data type. For example, the basic learning data may be pre-classified to various standards such as an area in which the learning data is generated, time at which the learning data is generated, a size of the learning data, a genre of the learning data, a generator of the learning data, an object type within the learning data, or the like. The model assessor may be a configuration for enhancing a result of the data determining model.

At least one from among the data obtainer, the preprocessor, the learning data selector, the model learner, and the model assessor described above may be implemented as a software module or manufactured to at least one hardware chip form and mounted to the electronic device. For example, at least one from among the data obtainer, the preprocessor, the learning data selector, the model learner, and the model assessor may be manufactured to a dedicated hardware chip form for artificial intelligence (AI), or manufactured as a generic-purpose processor (e.g., CPU or application processor) according to the related art or as part of a graphics dedicated processor (e.g., GPU) and mounted to the various electronic devices described above.

In addition, the data determiner 620 may further include a data obtainer, a preprocessor, an input data selector, a recognition result provider, and a model updater. The data obtainer may be a configuration for obtaining input data. The preprocessor may be a configuration for preprocessing the data obtained from the obtainer to a pre-defined format. The input data selector may be a configuration for selecting data necessary in recognition from among the preprocessed data. The recognition result provider may be a configuration capable of receiving data selected from the input data. The model updater may be a configuration for updating the data determining model based on an analysis on the recognition result provided from the recognition result provider. At least one from among the data obtainer, the preprocessor, the input data selector, the recognition result provider, and the model updater described above may be implemented as a software module or manufactured to at least one hardware chip form and mounted to the electronic device. For example, at least one from among the data obtainer, the preprocessor, the learning data selector, the model learner, and the model assessor may be manufactured to a dedicated hardware chip form for artificial intelligence (AI), or manufactured as a generic-purpose processor (e.g., CPU or application processor) according to the related art or as part of a graphics dedicated processor (e.g., GPU) and mounted to the various electronic devices described above.

The data determining model may be constructed taking into consideration the application field of the recognition model, the objective of the learning, the computer performance of the device, or the like. The data determining model may be, for example, a model based on a neural network. The data determining model may be designed to simulate the human brain structure on a computer. The data determining model may include a plurality of network nodes having weighted value that may simulate a neuron of a human neural network. The plurality of network nodes may each establish a connection relationship so that the neurons simulate the synaptic activity of sending and receiving signals through the synapse. The data determining model may, for example, include a neural network model or a deep learning model developed from the neural network model. In the deep learning model, a plurality of network nodes may be located at different depths (or, layers), and may transmit and receive data according to a convolution connection relationship.

For example, models such as a deep neural network (DNN), a recurrent neural network (RNN), and a bidirectional recurrent deep neural network (BRDNN) may be used as a data determining model, but the embodiment is not limited thereto.

According to the various embodiments of the disclosure, the electronic device 100 may train the artificial intelligence model based on data which has completed verification and agreement with the another electronic device, and use the trained artificial intelligence model to verify the shared data. The electronic device 100 and the another electronic device may, with respect to data generated in each of the electronic devices, identify as normal data through the above-described distribution system. However, the distribution system comprised of the electronic device 100 and the another electronic device in some cases may not identify whether data generated from the external electronic device with which the program was not shared is normal data. For example, the first electronic device 100-1 may pay a cost based on a number of clicks with respect to the advertisement. In this case, even if an abnormal click is generated in the external electronic device, the electronic device 100 and the another electronic device may identify the data including information on the abnormal click generated in the external electronic device (e.g., second data) as verified data.

The electronic device 100 may analyze data generated from the external electronic device, and identify whether the corresponding data is a fraud data. For example, if the act of fraud is a plurality of acts by bots or the like, the electronic device 100 may, based on clicks being generated by a pre-set number of times for a specific time, identify the data on the corresponding clicks as fraud data. Based on the verified data including data generated from the external electronic device being identified as fraud data, the electronic device 100 may agree with the another electronic device that the corresponding data is fraud data.

That is, the electronic device 100 may, based on identifying the data on the another electronic device which is a configuration of the distribution system as data which may be trusted through the above-described various methods, identify whether the data of the external electronic device is fraud data. Accordingly, the electronic device 100 may, when taking into consideration as to whether the data generated from the another electronic device is fraud data, obtain an accurate result considering only the data generated in the external electronic device.

Further, the electronic device 100 may identify the data identified as fraud data as described above as learning data of the artificial intelligence model and train the artificial intelligence model. That is, the electronic device 100 may, by training the artificial intelligence model by using the learning data with the high accuracy on the various acts of fraud, enhance the performance of the artificial intelligence model.

Figure 8:
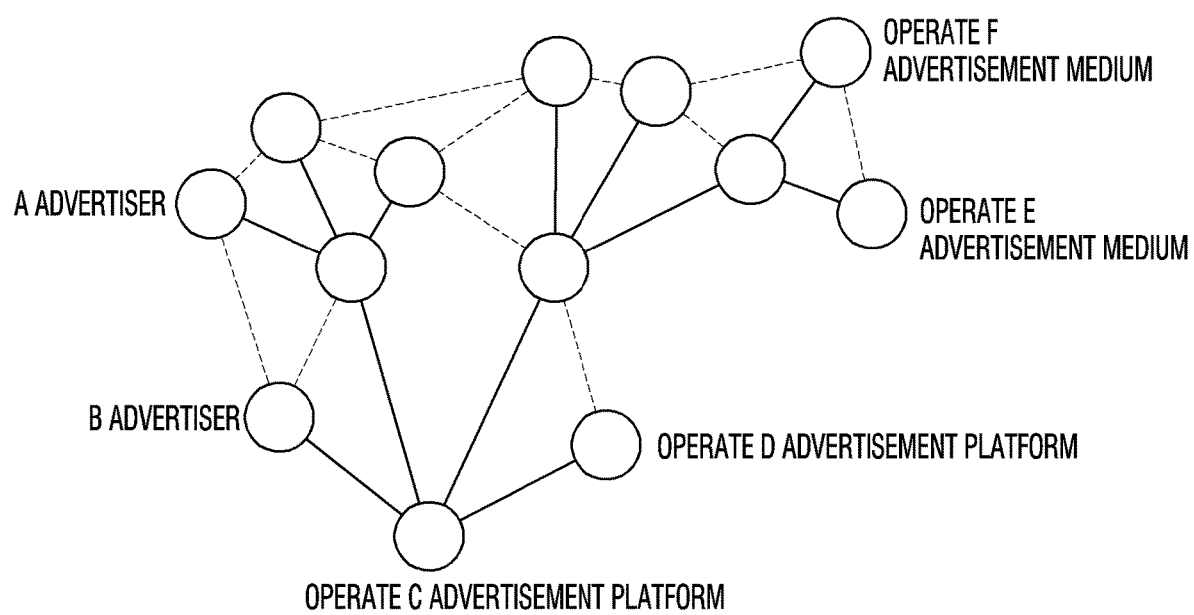
FIG. 8 is an example view illustrating various embodiments of the disclosure.

FIG. 8 is an example view illustrating various embodiments of the disclosure.

In the disclosure, although the first electronic device to the third electronic device 100-1 to 100-3 performing different roles from one another has been described as sharing a program for verifying data related to the advertisement and data on the event, the embodiment is not limited thereto. As illustrated in FIG. 8, the plurality of electronic devices may share one program and verify data according to the shared program. That is, the plurality of advertiser electronic devise, the plurality of advertisement platform electronic devices, and the plurality of advertisement media electronic devices may share one program, and may share, verify, and agree on the data according to the shared program.

FIG. 9 is a flowchart illustrating a control method of an electronic device according to an embodiment.

First, the electronic device 100 may share data on the advertisement with the another electronic device and obtain a program for verifying the shared data (S910). The program for verifying the data on the advertisement may include a variety of information related to advertisement publication and cost payment such as rules on the publishing entity of the advertisement data, the condition for exposing the advertisement, cost payment information on the exposure, or the like.

The electronic device 100 may transmit the obtained program to the another electronic device (S920). The electronic device 100 may share the obtained program with the another electronic device for verifying the data.

The electronic device 100 may, based on an event on the advertisement occurring, generate a first data including information on the event with respect to the advertisement. The event on the advertisement may be an event for transmitting the advertisement to the second electronic device 100-2 by the first electronic device 100-1, an event for allocating the advertisement to the third electronic device 100-3 by the second electronic device 100-2, an event for receiving information on the advertisement exposure from the external electronic device by the third electronic device 100-3, or the like, and the first data may include at least one from among a data generating entity, information on the time at which the data has been generated, and information on the time at which the data is transferred.

The electronic device 100 may transmit the generated first data to the another electronic device (S940). The electronic device 100 may share the first data with the another electronic device for verification. At this time, the another electronic device may verify the first data by using the obtained program.

After the program is shared with the another electronic device, the electronic device 100 may receive a second data including information on an event with respect to the advertisement generated from the another electronic device (S950). The electronic device 100 may verify the second data by using the program for verifying the shared data (S960).

In the disclosure, the method of data sharing and verification between the electronic devices with respect to the digital advertisement system has been described, but the embodiment is not limited thereto, and the technical idea of the disclosure may be applied to a variety of fields to secure the reliability of data shared between the plurality of electronic devices.

The terms "part" or "module" used in the disclosure may include a unit configured as a hardware, software, or firmware, and may be used interchangeably with terms such as, for example, and without limitation, logic, logic blocks, parts, circuits, or the like. "Part" or "module" may be a component integrally formed or a minimum unit or a part of the component performing one or more functions. For example, a module may be configured as an application-specific integrated circuit (ASIC).

One or more embodiments may be implemented with software including instructions stored in a machine-readable storage media (e.g., computer). The machine may call an instruction stored in the storage medium, and as a device capable of operating according to the called instruction, may include an electronic device (e.g., electronic device 100) according to the above-mentioned embodiments. Based on the instruction being executed by the processor, the processor may directly or under the control of the processor perform a function corresponding to the instruction using different elements. The instructions may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored in the storage medium and data temporarily being stored. For example, the 'non-transitory storage medium' may include a buffer in which data is temporarily stored.

According to an embodiment, a method according to one or more embodiments may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product (e.g., downloadable app) may be at least stored temporarily in a storage medium such as a server of a manufacturer, a server of an application store, or a memory of a relay server, or temporarily generated.

Each of the elements (e.g., a module or a program) according to various embodiments may be comprised of a single entity or a plurality of entities, and some sub-elements of the abovementioned sub-elements may be omitted, or different sub-elements may be further included in the various embodiments. Alternatively or additionally, some elements (e.g., modules or programs) may be integrated into one entity to perform the same or similar functions performed by each respective element prior to integration. Operations performed by a module, a program, or another element, in accordance with various embodiments, may be performed sequentially, in a parallel, repetitively, or in a heuristically manner, or at least some operations may be performed in a different order, omitted or a different operation may be added.

What is claimed is:

1. A method for controlling an electronic device, the method comprising:

sharing, by at least one hardware processor of the electronic device with another electronic device, data related to an advertisement to be performed and obtaining a program for verifying the shared data, wherein the at least one hardware processor comprises a dedicated hardware processor comprising at least one of a data learner and a data determiner, wherein the data learner trains an artificial intelligence model to verify a reliability of input data, wherein the data determiner identifies the reliability of the input data, and wherein the artificial intelligence model is trained to verify the reliability of the input data;

after obtaining the program, transmitting, by the at least one hardware processor, the obtained program to the other electronic device;

based on the data related to the advertisement to be performed, generating, by the at least one hardware processor, first data comprising first information with respect to the advertisement to be performed;

transmitting, by the at least one hardware processor to the other electronic device, the generated first data;

receiving, by the at least one hardware processor from the other electronic device performed an event on the advertisement, second data comprising second information on the event with respect to the advertisement performed, wherein the second data comprises information on data input from an external electronic device with which the program is not shared;

inputting the second data to the trained artificial intelligence model;

verifying, by the at least one hardware processor, the second data by comparing the generated first data and the received second data using the program; and obtaining a reliability of the second data, wherein the trained artificial intelligence model is trained by learning data which is shared and verified between the electronic device to the other electronic device and is periodically trained without human's action by using data identified as fraud data by the electronic device and the other electronic device as learning data.

2. The method of claim 1, further comprising encrypting, by the at least one hardware processor, the first data by using unique key information of the electronic device.

3. The method of claim 1, wherein the first data or the second data comprises at least one of time information at which the first data or the second data is generated, information of the electronic device or the other electronic device, or time information at which the first data or the second data is shared with the other electronic device.

4. The method of claim 1, wherein the first data comprises at least one of identification information on the advertisement data, time information at which the advertisement data is generated, or time information at which the generated advertisement data is transmitted to the other electronic device.

5. An electronic device, comprising:

a communicator;

at least one hardware processor, wherein the at least one hardware processor comprises a dedicated hardware processor comprising at least one of a data learner and a data determiner, wherein the data learner trains an artificial intelligence model to verify a reliability of input data, wherein the data determiner identifies the reliability of the input data, wherein the artificial intelligence model is trained to verify the reliability of the input data; and a memory storing instructions which, when executed by the at least one hardware processor, cause the at least one hardware processor to:

share, with an another electronic device, data related to an advertisement to be performed and obtain a program to verify the shared data, transmit, through the communicator to the other electronic device, the obtained program, based on the data related to the advertisement to be performed, generate first data comprising first information with respect to the advertisement to be performed, transmit, through the communicator to the other electronic device, the generated first data, receive, through the communicator from the other electronic device performed an event on the advertisement, second data comprising second information on the event with respect to the advertisement performed, wherein the second data comprises information on data input from an external electronic device with which the program is not shared, input the second data to the trained artificial intelligence model, verify the second data by comparing the generated first data and the received second data using the program, and obtain a reliability of the second data, wherein the trained artificial intelligence model is trained by learning data which is shared and verified between the electronic device to the other electronic device and is periodically trained without human's action by using data identified as fraud data by the electronic device and the other electronic device as learning data.

6. The electronic device of claim 5, wherein the instructions, when executed by the at least one hardware processor, further cause the at least one hardware processor to encrypt the first data using unique key information of the electronic device.

7. The electronic device of claim 5, wherein the first data or the second data comprises at least one of time information at which the first data or the second data is generated, information of the electronic device or the other electronic device, or time information at which the first data or the second data is shared with the other electronic device.

* * * * *